US011206815B2

(12) United States Patent
Elam

(10) Patent No.: US 11,206,815 B2
(45) Date of Patent: Dec. 28, 2021

(54) RETRACTABLE LEASH LOCKING ASSEMBLIES, AND SYSTEMS AND METHODS THEREOF

(71) Applicant: ROLLO PET COMPANY LLC, Los Angeles, CA (US)

(72) Inventor: John Michael Elam, Los Angeles, CA (US)

(73) Assignee: Rollo Pet Company LLC, Los Angeles, CA (US)

( * ) Notice: Subject to any disclaimer, the term of this patent is extended or adjusted under 35 U.S.C. 154(b) by 262 days.

(21) Appl. No.: 16/588,826

(22) Filed: Sep. 30, 2019

(65) Prior Publication Data

US 2020/0100469 A1 Apr. 2, 2020

(51) Int. Cl.
*A01K 27/00* (2006.01)

(52) U.S. Cl.
CPC .......... *A01K 27/004* (2013.01); *A01K 27/002* (2013.01); *A01K 27/008* (2013.01)

(58) Field of Classification Search
CPC .... A01K 27/004; A01K 27/003; A01K 27/00; B65H 75/38; B65H 75/406; B65H 75/40; B65H 75/48; B65H 75/4473; B65H 75/486; B65H 75/4418; G01B 3/1005; G01B 2003/1023
See application file for complete search history.

(56) References Cited

U.S. PATENT DOCUMENTS

| 7,461,615 | B2 * | 12/2008 | Albright | A01K 27/004 |
| | | | | 119/794 |
| 10,412,934 | B2 * | 9/2019 | Max | A01K 27/004 |
| 2013/0276718 | A1 * | 10/2013 | Valadez | B65H 75/4431 |
| | | | | 119/796 |
| 2019/0297853 | A1 * | 10/2019 | Blakemore | B65H 75/4471 |

FOREIGN PATENT DOCUMENTS

WO  WO-2009108925 A2 * 9/2009 ........... A01K 27/004

\* cited by examiner

*Primary Examiner* — Kristen C Hayes

(57) ABSTRACT

A system, comprising: an axle structure defining an axis of rotation; an engagement plate translatable between a first position and a second position in a direction parallel to the axis of rotation, the engagement plate comprising one or more tooth protrusions and one or more ramp recesses; a spool rotatably movable about the axle structure, the spool comprising one or more tooth recesses configured to mate with the one or more tooth protrusions of the engagement plate responsive to a movement of the engagement plate into the second position; and a release ring at least partially rotatable between a first release ring position and a second release ring position, the release ring comprising one or more ramps; wherein, responsive to a predetermined movement of an actuator, the release ring is causes the tooth protrusions of the engagement plate to disengage with the tooth recesses of the spool.

21 Claims, 19 Drawing Sheets

RETRACTABLE LEASH LOCKING ASSEMBLIES, AND SYSTEMS AND METHODS THEREOF

CROSS-REFERENCE TO RELATED APPLICATION

The present application claims priority to U.S. Provisional Patent Application No. 62/739,251, filed Sep. 30, 2018 and titled "SYSTEMS AND METHODS FOR PROVIDING RETRACTABLE LEASH ASSEMBLIES," which is incorporated herein by reference in its entirety.

TECHNICAL FIELD

Embodiments of the present disclosure relate generally to novel retractable leash assemblies, and in particular some embodiments of the present disclosure relate to receptacles, locking mechanisms, and harnessing features associated with such novel retractable leash assemblies.

BACKGROUND

Conventional retractable leash devices are commonly used by pet owners as a means of automatically recovering slack in a connected leash as their pets move about. Conventional retractable leash devices offer a convenient solution that eases the burden on humans when interacting with animals. Conventional retractable leash devices are only equipped with rudimentary locking mechanisms that are far too cumbersome, and require housing structures that are too bulky for the convenience that they provide. Moreover, conventional retractable leashes do not provide an effective mechanism for releasable attachment to an animal harness. Thus, for example, after someone has used the leash to walk their dog to the park and finally arrived in an area where they can unleash the dog, they must continue to hold or otherwise keep track of the conventional retractable leash devices until they are ready to reattach the leash to the dog and resume use of the retractable leash device. Not only is this very inconvenient, but it can also give rise to additional costs and additional risk.

For example, humans may set down, forget about, or otherwise misplace their retractable leash devices while there animals are unleashed. Such misplacing such retractable leash devices can be the cause of great frustration, and result in repetitive purchases of new retractable leash devices, and corresponding increase costs. Additionally, the loss of such retractable leash devices when a user is out and about with their animal can give rise to additional risks such as safety risks. For example, after a user has misplaced their retractable leash device, the unleashed dog may more easily dart out into the road or into areas that are otherwise unsafe.

Moreover, conventional hand-held retractable leash devices are configured with leash buckles that attach to the animal's neck collar, which in many instances can give rise to neck or throat pain, or other damage to the animal.

Accordingly, what is missing and therefore needed, is an advanced retractable leash solution that addresses the foregoing problems.

BRIEF SUMMARY OF THE EMBODIMENTS

In accordance with one or more embodiments of the instant disclosure, systems and methods for advanced retractable leash solutions are presented. In accordance with some embodiments, example systems of the present disclosure includes one or more of: a harness configured to be releasably attached to a portion of an animal; a retractable leash assembly comprising a first structural feature and a second structural feature; a receptacle coupled with the harness, the receptacle comprising a first structural feature and a second structural feature; wherein the first structural feature of the retractable leash assembly is configured to be releasably mated with the first structural feature of the receptacle upon application of a force on the retractable leash assembly causing at least a portion of the retractable leash to move in a first direction; and wherein the second structural feature of the retractable leash assembly is configured to be releasably mated with the second structural feature of the receptacle upon application of a force on the retractable leash assembly causing at least a portion of the retractable leash to move in a second direction.

In accordance with some embodiments of the present disclosure, the retractable leash assembly may include a housing enclosing a spool; a locking assembly coupled to the spool (and in some embodiments, including the spool or one or more features of the spool); and a leash coupled at one end with the spool inside the housing, with a portion of the leash extending outside the housing through an orifice or keyhole through the housing. The housing may include a handle portion and a leash enclosure portion, where the spool, locking assembly, and at least a portion of the leash are substantially enclosed within the leash enclosure portion of the housing. The spool may be configured to rotate about an axis, and the handle portion is positioned outside the perimeter of the spool and substantially aligned with, parallel to, or within the plane of rotation of the spool.

In accordance with some embodiments of the present disclosure, a second end of the leash is coupled to a clasp outside the housing, the clasp having a dimension larger than at least one dimension of the orifice through the housing to prohibit the clasp from passing through the orifice. In some embodiments the clasp is configured specifically for attachment to a portion of one or more embodiments of the novel harnesses or leash receptacles discussed in the present disclosure. In some embodiments, the clasp is configured to prevent or otherwise discourage attachment to a traditional neck collar of an animal.

In accordance with some embodiments of the present disclosure, the first structural feature of the retractable leash assembly includes a first rigid formation protruding from at least a portion of the housing of the retractable leash device, and extending beyond at least a portion of the leash enclosure portion of such housing in at least one radial direction relative to the spool. In some instances throughout the present disclosure, such an example first rigid formation protruding in the aforementioned manner is referred to as a nose of the retractable leash assembly.

In accordance with some embodiments of the present disclosure, the first structural feature of the receptacle forms a first aperture within a first rigid formation protruding outward from a support plate of the receptacle. The first aperture of the first rigid formation of the receptacle may be fitted to receive and at least partially circumscribe at least a portion of the first rigid formation of the retractable leash assembly. In some instances throughout the present disclosure, such an example first rigid formation protruding in the aforementioned manner is referred to as a nose of the retractable leash assembly.

In accordance with some embodiments of the present disclosure, the first structural feature of the retractable leash assembly may include a depression formation (as an alternative or in addition to a protruding nose formation) within at least a portion of the leash enclosure portion of the housing in at least one radial direction relative to the spool. In some such embodiments, the first structural feature of the receptacle may complementarily include a protrusion extending from the first rigid formation extending outward from a support plate of the receptacle. The first protrusion of the receptacle, in such an embodiment, may be fitted to be positioned within and be at least partially circumscribed by at least a portion of the depression formation of the leash enclosure portion of the housing of a retractable leash assembly. In other words, instead of or in addition to the nose protrusion being formed on the housing of the retractable leash assembly and configured for mating with a depression, slot, hole, cavity, or other aperture in the receptacle, a nose protrusion may be formed on a portion of the receptacle itself and configured for mating with a depression, slot, hole, cavity, or other aperture in the housing of the receptacle leash assembly.

In accordance with some embodiments of the present disclosure, the second structural feature of the retractable leash assembly includes a female snap-fit joint formation. Additionally or alternatively, in some embodiments the second structural feature of the receptacle includes a male snap-fit joint formation complementary to the female snap-fit joint formation. In some such embodiments, one or more of the female snap-fit joint formation and the male snap-fit joint formation comprise a cantilever snap-fit joint, a U-shaped snap-fit joint, a torsion snap-fit joint, a ball snap-fit joint, and an annular snap joint.

In accordance with some embodiments of the present disclosure, the second structural feature of the receptacle comprises a male snap-fit joint formation complementary to the female snap-fit joint formation where the male snap-fit joint formation and female snap-fit joint formation are separably complimentary. Separably complimentary refers generally to the ability of two or more matable (sometimes referred to herein as "engageable" or "coupleable") structures to be repeatedly mated and unmated (or engaged and disengaged, or coupled and uncoupled) upon application of a sufficient force bringing the two or more together or drawing two for more apart. For example, as it pertains to the snap-fit joints discussed here, separably complimentary generally refers to the ability of the male snap-fit joint formation and the female snap-fit formation to be mated and unmated (e.g., coupled and uncoupled) upon application of a sufficient force in a first and second direction, respectively, without causing a substantial plastic deformation (e.g., inelastic deformation) in one or more of the structures that define the male snap-fit joint formation and the female snap-fit formation.

In accordance with some embodiments of the present disclosure, the second structural feature of the retractable leash assembly may include a female snap-fit joint formation. The second structural feature of the receptacle may include a male snap-fit joint formation complementary to the female snap-fit joint formation; and the male snap-fit joint formation and female snap-fit joint formations may be separably complimentary.

In accordance with some embodiments of the present disclosure, the male snap-fit joint formation includes a partially deflectable cantilever member having a first protrusion, and wherein the female snap-fit joint formation includes a first depression configured to receive at least a portion of the first protrusion of the cantilever member during a joining operation. During an example joining operation the cantilever member may be partially deflected as it is forced along a surface proximal to the first depression. In some embodiments, during an example joining operation, such an example cantilever member at least partially recovers from the deflection when the protrusion of the cantilever member is substantially aligned with a first depression region of an female snap-fit formation.

In accordance with some embodiments of the present disclosure, the male snap-fit joint formation and the female snap-fit joint formation are invertably complementary as well as separably complimentary. Invertably complimentary, as used in connection with two or more matable (sometimes referred to herein as "engageable" or "coupleable") structures herein, refers generally to the ability of the structures be mated and unmated (or engaged and disengaged, or coupled and uncoupled) in a similar fashion when one such structure approaches the other such structure in either of at least two orientations (e.g., right-side up, or upside-down, or otherwise flipped about given axis) during a joining operation, the one orientation referred to as being "inverted" relative to the other(s).

In accordance with some embodiments of the present disclosure, the first protrusion of an example cantilever member of a second structural feature of an example receptacle (or, alternatively or additionally, a first protrusion of an example cantilever member of a second structural feature of an example housing of a retractable leash assembly) may include one or more of a hook structure, a stud structure, and a bead structure.

In accordance with some embodiments of the present disclosure, a depression formation in the leash enclosure portion of the housing of a retractable leash assembly (or, alternatively or additionally, a depression formation in the second structural feature of a receptacle assembly) may include one or more of a hole formation, an undercut formation, and a countersink formation. In some embodiments, the first structural feature of the retractable leash assembly comprises one or more of a countersink, hole, and undercut formation located within at least a portion of the leash enclosure portion of the housing in at least one radial direction relative to the spool. And in some such embodiments, the first structural feature of the receptacle comprises a first protrusion from a rigid formation extending outward from a support plate of the receptacle, the first protrusion fitted to be positioned within and at least partially circumscribed by at least a portion of one or more of the countersink, hole, and undercut formation.

In accordance with some embodiments of the present disclosure, an attached condition may be achieved when: the first structural feature of the retractable leash assembly is mated with the first structural feature of the receptacle, and the second structural feature of the retractable leash assembly is mated with the second structural feature of the receptacle. Conversely, a detached condition may be achieved when: a mated condition between first structural feature of the retractable leash assembly and the first structural feature of the receptacle is disengaged, and a mated condition between the second structural feature of the retractable leash assembly and the second structural feature of the receptacle is disengaged.

In accordance with some embodiments, and beginning with the retractable leash assembly in detached condition with respect to the receptacle, application of a force on the retractable leash assembly that may otherwise cause at least a portion of the retractable leash assembly to move in the second direction—and to thereby engage a mated condition between the second structural feature of the retractable leash assembly and the second structural feature of the receptacle—is substantially prohibited until the first structural feature of the retractable leash assembly and the first structural feature of the receptacle are in a mated condition.

In accordance with some embodiments, in the attached condition, the retractable leash assembly is held in a substantially fixed position relative to the position of the receptacle.

In accordance with some embodiments, application of a force on the retractable leash assembly may cause at least a portion of the retractable leash assembly to move in a third direction and cause the mated state between the second structural feature of the retractable leash assembly and the second structural feature of the receptacle to become disengaged. In some examples disclosed herein, such an application of a force on the retractable leash assembly is achieved when a user grips the handle portion of the retractable leash assembly and lifts upward.

In accordance with some embodiments, application of a force on the retractable leash assembly may cause at least a portion of the retractable leash assembly to move in a fourth direction and cause the mated state between the first structural feature of the retractable leash assembly and the first structural feature of the receptacle to be disengaged. In some examples disclosed herein, such an application of a force causing at least a portion of the retractable leash assembly to move in the fourth direction is a substantially smaller force than application of force causing at least a portion of the retractable leash assembly to move in the third direction. Indeed, in some embodiments, the structural relationship between the first structural feature of the retractable leash assembly and the first structural feature of the receptacle may allow the retractable leash assembly to pivot as the application of force causing the retractable leash assembly to move in the third direction occurs, the pivot movement itself (alone or together with other movements) generating the application of force sufficient to cause at least a portion of the retractable leash assembly to move in the fourth direction.

Though the application of force to cause the retractable leash assembly to move in the fourth direction may be small in comparison to the application of force to cause the retractable leash assembly to move in the third direction (assuming such force is applied to move the retractable leash assembly in the third direction), it should be noted that in accordance with some embodiments such movements in the fourth direction may be prohibited unless and until they move in in the third direction has taken place. That is, beginning with the retractable leash assembly in attached condition with respect to the receptacle, in accordance with some embodiments an application of a force on the retractable leash assembly causing at least a portion of the retractable leash assembly to move in the fourth direction is substantially prohibited until the second structural feature of the retractable leash assembly 200 and the second structural feature of the receptacle 400 achieve an unmated condition pursuant to a movement in a third direction (e.g., substantially upward).

In accordance with some embodiments, application of a force directly or indirectly on the second structural feature of the receptacle (e.g., not directly on the second structural feature of the retractable leash assembly) disengages a mated condition between a second structural feature of the receptacle and a second structural feature of the retractable leash assembly.

In accordance with some embodiments, the first direction and the second direction are different directions; in some instances the first direction and the second direction are substantially orthogonal relative to each other in at least one plane; in some instances the angle between the first direction and the second direction is between 10° and 170° degrees in at least one plane.

In accordance with some embodiments, the third direction and the fourth direction are different directions; in some instances, the third direction and the fourth direction are substantially orthogonal relative to each other in at least one plane; and in some instances the angle between the third direction and the fourth direction is between 10° and 170° degrees in at least one plane.

Referring now to harnesses of the present disclosure specifically, in accordance with some embodiments the harness comprises a back pad and an undercarriage pad, where the back pad configured to cover at least a portion of the back of an animal, and the undercarriage portion configured to cover at least a portion of the chest of an animal. In some embodiments, at least a portion of the back pad and the undercarriage pad are nonrigid (I.E. at least partially flexible) such that either or both may adapt to the form of the animal's body to which the harness is to be attached. In some embodiments, the harness is equipped with one or more front straps, the one or more front straps connecting a front side portion of the back pad to a front side portion of the undercarriage pad. In some embodiments, the harness is equipped with one or more rear straps, the one or more rear straps connecting a rear side portion of the back pad to a rear side portion of the undercarriage pad.

As the technology of the present disclosure is intended and adaptable for use with any shape or size of animal, in some embodiments harnesses of the present disclosure may be equipped with adjustable straps. For example, one or more of the front straps and rear straps may be adjustable in length. In another example, one or more of the front straps and rear straps may be made, in whole or in part of elastomeric materials to provide additional flexibility as an animal moves about. Additionally or alternatively, in some embodiments one or more of the front straps and rear straps connect to one or more of the front side portion and the rear side portion of one or more of the back pad and undercarriage pad via a buckle. Still further embodiments, one or more of the front straps and rear straps may be adjustable via one or more of a ladder-lock adjuster, a slider adjuster, a hook and loop fastener, and an adjustable buckle fastener.

As disclosed in further detail herein, in some embodiments the support plate of the receptacle is attached to or otherwise coupled with the back pad of the harness. In some embodiments the attachment or couple is permanent, while in other embodiments the attachment or couple is releasable to enable detachment under certain conditions. In some embodiments, the support plate of the receptacle is attached to the non-rigid back pad, and at least a portion of one or more of the first structural feature of the receptacle and the second structural feature of the receptacle protrude from the support plate in a substantially perpendicularly direction in at least one plane. In some embodiments, the substantially perpendicular direction is substantially vertical relative to the earth's surface when the harness is attached to a four-legged standing animal.

In accordance with one or more embodiments of the present disclosure, the outer surface of the housing of the retractable leash assembly is substantially symmetrical about at least one plane. In still further embodiments, the outer surface of the housing of the retractable leash assembly is substantially symmetrical about at least two orthogonal planes. In some embodiments, the outer surface of the housing of the retractable leash assembly is substantially symmetrical about at least one plane; and where in the at least one plane is substantially parallel with the plane of rotation of the spool.

In accordance with some embodiments of the present disclosure, the retractable leash assembly includes an actuator assembly having an actuatable component (e.g., a button, a trigger, a slider, etc.) movably mounted on an outer portion of the handle portion of the housing. In some embodiments, the actuatable component is configured to passively permit operation of a lock mechanism (also referred to herein as a lock assembly) when in a first position, and actively disengage the lock mechanism when in a second position. In some embodiments, the actuatable component is configured to actively engage or passively permit operation of a lock mechanism when in a first position, and actively disengage or passively permit disengagement of the lock mechanism when in a second position.

In accordance with some embodiments of the present disclosure, when the actuatable component is cause to move into the second position, a clock spring within the housing and coupled with the spool is caused to become unrestricted by the lock mechanism. In some embodiments, when the clock spring is unrestricted by the lock mechanism (and the leash wound around the spool has been at least partially drawn out), the clock spring causes the spool to spin in a direction that causes a portion of the leash drawn out of the housing to become really wound about the spool, thus retracting back into the housing. In some embodiments, and unrestricted clock spring within the housing is configured to rewind the leash around his spool until one or more of a first condition, a second condition, and a third condition occurs. In some embodiments, the first condition occurs when the length of the leash is wound to the point that the clasp on the second end of the leash reaches the orifice of the housing. In some embodiments, the second condition occurs when resistance caused from a pulling force on the leash overcomes the force being applied to the spool by the clock spring. In some embodiments, the third condition occurs when the clock spring unwinds to a point that it cannot fit any more of the leash material around the barrel of the spool without further restraining the rotatable movement of the spool on account of friction of the leash with another structure within the housing.

In accordance with some embodiments of the present disclosure, the retractable leash assembly is equipped with a subsystem (also referred to herein as a system) comprising a lock assembly, the subsystem configured to enable controlled release and retraction of a leash responsive to various movements of an actuator. In some embodiments of the present disclosure, the lock assembly subsystem may include one or more of: an axle structure extending at least partially between a portion of a first support and a portion of a second support, the axle structure defining an axis of rotation; an engagement plate circumscribing a portion of the axle structure and rotatably fixed relative to the first support, the engagement plate translatable between a first engagement position and a second engagement position in a direction parallel to the axis of rotation, the engagement plate comprising one or more tooth protrusions and one or more ramp recesses; a spool circumscribing a portion of the axle structure, the spool rotatably movable about the axle structure, the spool comprising one or more tooth recesses configured to mate with the one or more tooth protrusions of the engagement plate responsive to a movement of the engagement plate into the second position; and a release ring at least partially rotatable between a first release ring position and a second release ring position about the axis of rotation, the release ring comprising one or more ramps. In some embodiments, responsive to a predetermined movement of an actuator, the release ring is rotated from the first release ring position into the second release ring position, causing the one or more ramps to become misaligned with one or more of the ramp recesses and to push the engagement plate toward the first support and into the first engagement position such that the tooth protrusions of the engagement plate disengage with the tooth recesses of the spool.

In some embodiments, subsystems of the present disclosure further includes: a clutch spring compressed between a portion of the first support and the engagement plate, the clutch spring biasing translation of the engagement plate toward the second position. In some embodiments, subsystems of the present disclosure further include: a clock spring coupled to the spool; wherein rotation of the spool in a first direction causes rotation of a going barrel of the clock spring in the first direction, the rotation of the going barrel in the first direction causing a coil of the clock spring to tighten. In some embodiments, when the tooth protrusions of the engagement plate are caused to disengage with the tooth recesses of the spool, the clock spring causes the spool to rotate in a second direction. In some embodiments, the first direction of spool rotation and second direction of spool rotation are in opposite directions. For example, in some embodiments the first direction of spool rotation may be clockwise and the second direction of spool rotation may be counterclockwise. For example, in other embodiments the first direction of spool rotation may be counterclockwise and the second direction of spool rotation may be clockwise.

In some embodiments of the present disclosure, a second end of a leash is coupled with the spool, and a first end of the leash may be attached to a harness on an animal. In some embodiments, and animal's pulling force on a first end of the leash may cause the spool to rotate in the first direction.

In some embodiments, an actuator of the system comprises a slider; and wherein the predetermined movement involves the slider being moved from a first slider position into a second slider position. When such a predetermined movement occurs, the release ring may be caused to rotate from a second release ring position into a first release ring position such that the one or more ramps of the release ring are caused to align with the one or more ramp recesses of the engagement plate. Alignment of the one or more ramps with the one or more ramp recesses may permit the engagement plate to be forced into the second engagement position by the clutch spring such that the tooth protrusions of the engagement plate engage with the tooth recesses of the spool. In some embodiments, movement of the slider from a second slider position into a first slider position causes the release ring to rotate from the second release ring position into the first release ring position such that the one or more ramps move at least partially into the one or more ramp recesses of the engagement plate.

In some embodiments, rotation of the release ring from the second release ring position into the first release ring position allows the clutch spring to push the engagement plate into the first engagement position such that the tooth protrusions of the engagement plate engage with the tooth recesses of the spool and obstruct the spool from rotation in at least one direction. In some embodiments, a portion of the first side support and a portion of the second side support are configured to be coupled in a fixed spatial relationship relative to each other.

Some embodiments of the present disclosure may include an actuation assembly comprising an actuator (e.g., a slider, trigger, button, etc.) coupled with an actuator tang, the slider movable between a first slider position and a second slider position, the actuator tang coupled to the release ring such that the actuator tang causes the release ring to rotate in a first direction responsive to the slider being moved from the first slider position into the second slider position, and causes the release ring to rotate in a second direction responsive to the slider being moved from the second slider position into the first slider position. In some such embodiments, rotation of the release ring in the first direction responsive to the slider being moved from the first slider position into the second slider position causes the ramps of the release ring to push the engagement plate upward toward the first support such that the tooth protrusions of the engagement plate disengage with the tooth recesses of the spool and enable the spool to rotate about the axle structure unobstructed by the engagement plate.

In some embodiments, an actuation assembly of the present disclosure may include a button or a slider further coupled with an actuator tang, the actuator tang further coupled with a wireform, and the wireform further coupled to the release ring. A mouth bulge member many be disposed between the button and the button linkage member, the mouth bulge member having an aperture through which the button may be coupled with the button linkage member. The aperture within the mouth bulge member may further provide a track creating a path along which the button may be moved, movement upon which may further cause button linkage member to move, in turn causing the actuator tang to move along a path. The actuator tang's movement along such path may cause the wireform to push or pull on a portion of the release ring and cause the release ring to rotate in a first direction or a second direction.

In some embodiments, the actuator tang includes a plurality of pins, the plurality of pins being configured to be held within a track formed in at least a portion of the first support and the second support. In embodiments where a first housing member provides the first support, and a second housing member provides the second support, the track within which the actuator tang's plurality of pins may be held comprises a cutout within the structure of the first housing member and a substantially matching/mirroring cutout within the structure of the second housing member. In some embodiments the cutout within the structure of the first housing member and cutout within the structure of the second housing member define a movement path for the actuator tang in response to movement of the button. In some embodiments, the movement path is in the shape of an arc that substantially matches the radial profile of the release ring.

BRIEF DESCRIPTION OF THE DRAWINGS

The technology disclosed herein, in accordance with one or more various embodiments, is described in detail with reference to the included figures. The figures include drawings that are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

To aid in the detailed description and related discussion concerning one or more of the above figures, a relative direction legend is sometimes provided in connection with the drawings. The relative direction legend designates a relative forward facing direction, a relative rearward facing direction, and relative upward facing direction, a relative downward facing direction, a relative left facing direction, and a relative right facing direction. It should be appreciated that the direction legend is merely a construct for a convention for discussing the figures as shown, and is in no way intended to be limiting on the scope of the present disclosure.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

In accordance embodiments of the present disclosure, example systems of the present disclosure may include one or more of: a harness configured to be releasably attached to a portion of an animal; a retractable leash assembly comprising a first structural feature and a second structural feature; a receptacle coupled with the harness, the receptacle comprising a first structural feature and a second structural feature; wherein the first structural feature of the retractable leash assembly is configured to be releasably mated with the first structural feature of the receptacle upon application of a force on the retractable leash assembly causing at least a portion of the retractable leash to move in a first direction; and wherein the second structural feature of the retractable leash assembly is configured to be releasably mated with the second structural feature of the receptacle upon application of a force on the retractable leash assembly causing at least a a portion of the retractable leash to move in a second direction.

Figure 1A:
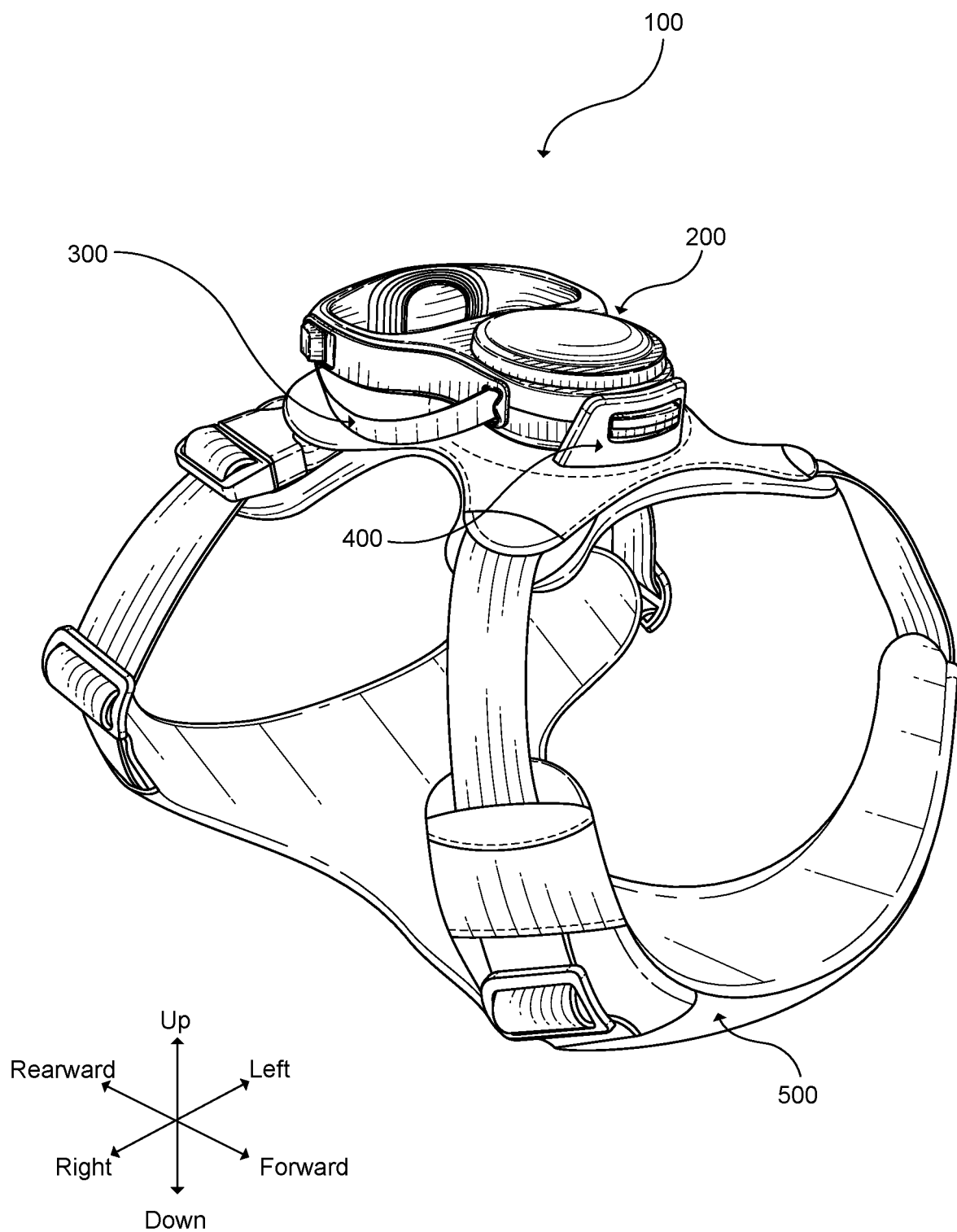
FIG. 1A illustrates an example system in accordance with one or more embodiments of the present disclosure, here depicting a perspective view of an example retractable leash assembly releasably attached to an example complementary receptacle in accordance with one or more embodiments of the present disclosure.

FIG. 1A illustrates an example system in accordance with one or more embodiments of the present disclosure, here depicting a perspective view of an example retractable leash assembly releasably attached to an example complementary receptacle in accordance with one or more embodiments of the present disclosure. As shown, an example system 100 may include retractable leash assembly 200 releasably mated with and held by receptacle assembly 400 coupled to harness 500. System 100 may further include a leash member 300 coupled to a clasp on one end and a component of the retractable leash assembly on another end. Harness 500 is configured to be releasably worn upon or otherwise attached to a portion of an animal (e.g., the core of an animal's body). In some embodiments, an upper portion of the harness 500 is configured to sit on the back of an animal, while a lower portion of the harness 500 is configured to hover beneath the core of the animal, often snug against a chest region of an animal.

Retractable leash assembly 200 is configured to be releasably coupled with the harness 500 via receptacle 400. That is, system 100 may include a receptacle 400 coupled with the harness 500 and providing a means for releasably coupling the retractable leash assembly 200 with the leash while the harness is worn on an animal. In some embodiments receptacle 400 may be considered a component part of harness 500, or a component part of retractable leash assembly 200, or may be considered a standalone component that provides a coupling mechanism therebetween. Only a portion of an example receptacle 400 is visible in FIG. 1A. Receptacle 400 may be configured to hold retractable leash assembly 200 in a substantially fixed orientation with respect to harness 500. For example, as shown retractable leash assembly 200 is configured with a nose portion (e.g., a first structural feature of the retractable leash assembly 200) that may fit within an orifice formed in the portion of the example receptacle 400 that is visible (e.g., a first structural feature of receptacle 400). This mating element, among others (e.g., including other examples which allow a different portion of the retractable leash assembly 200 to snap into place after the first structural feature of the retractable leash assembly 200 in the first structural feature of the receptacle 400 are mated, described in further detail below) enable one or more features of the presently disclosed technology.

Figure 1B:
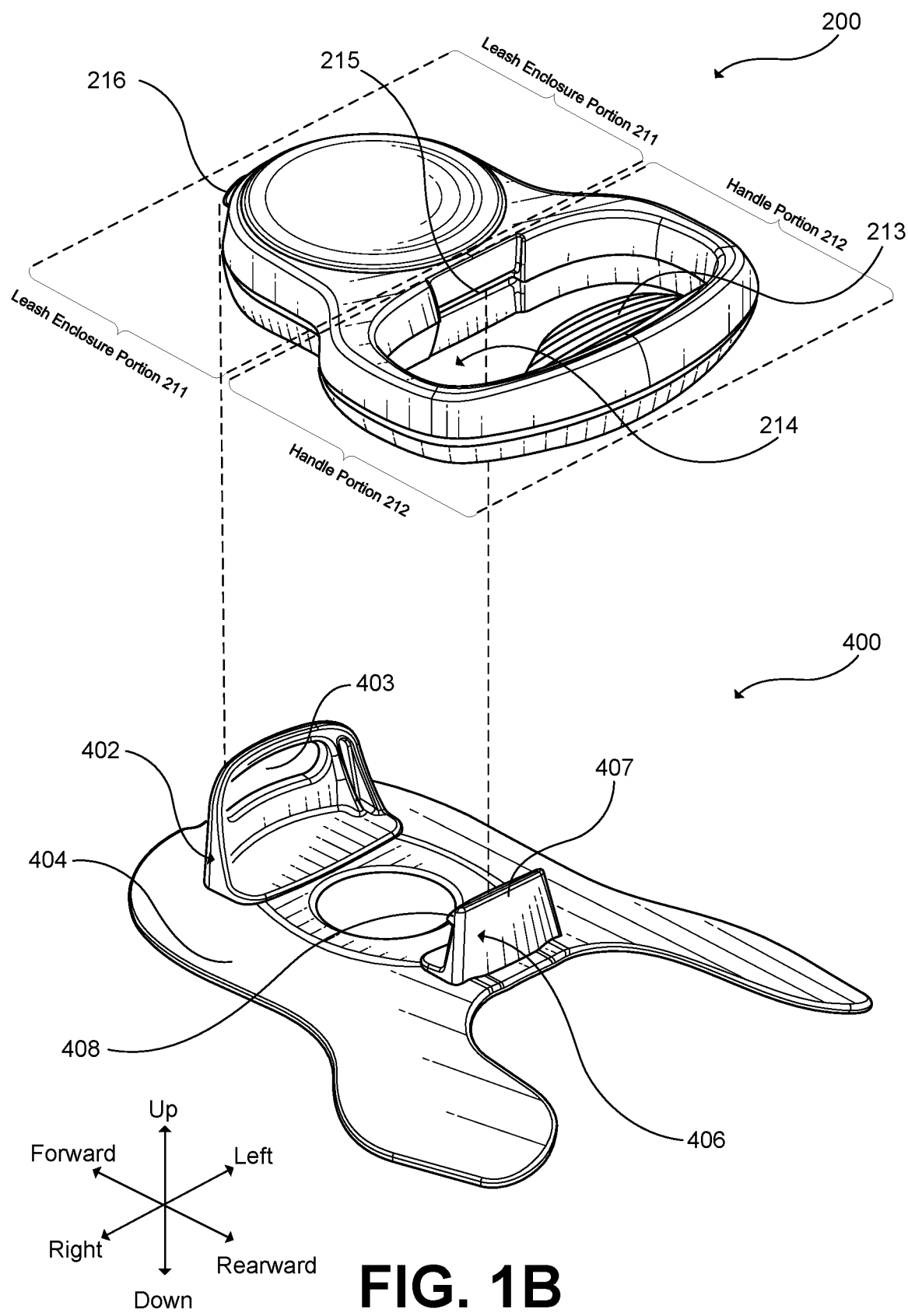
FIG. 1B illustrates an example retractable leash assembly in a detached condition with respect to an example receptacle, in accordance with one or more embodiments of the present disclosure.
Figure 1C:
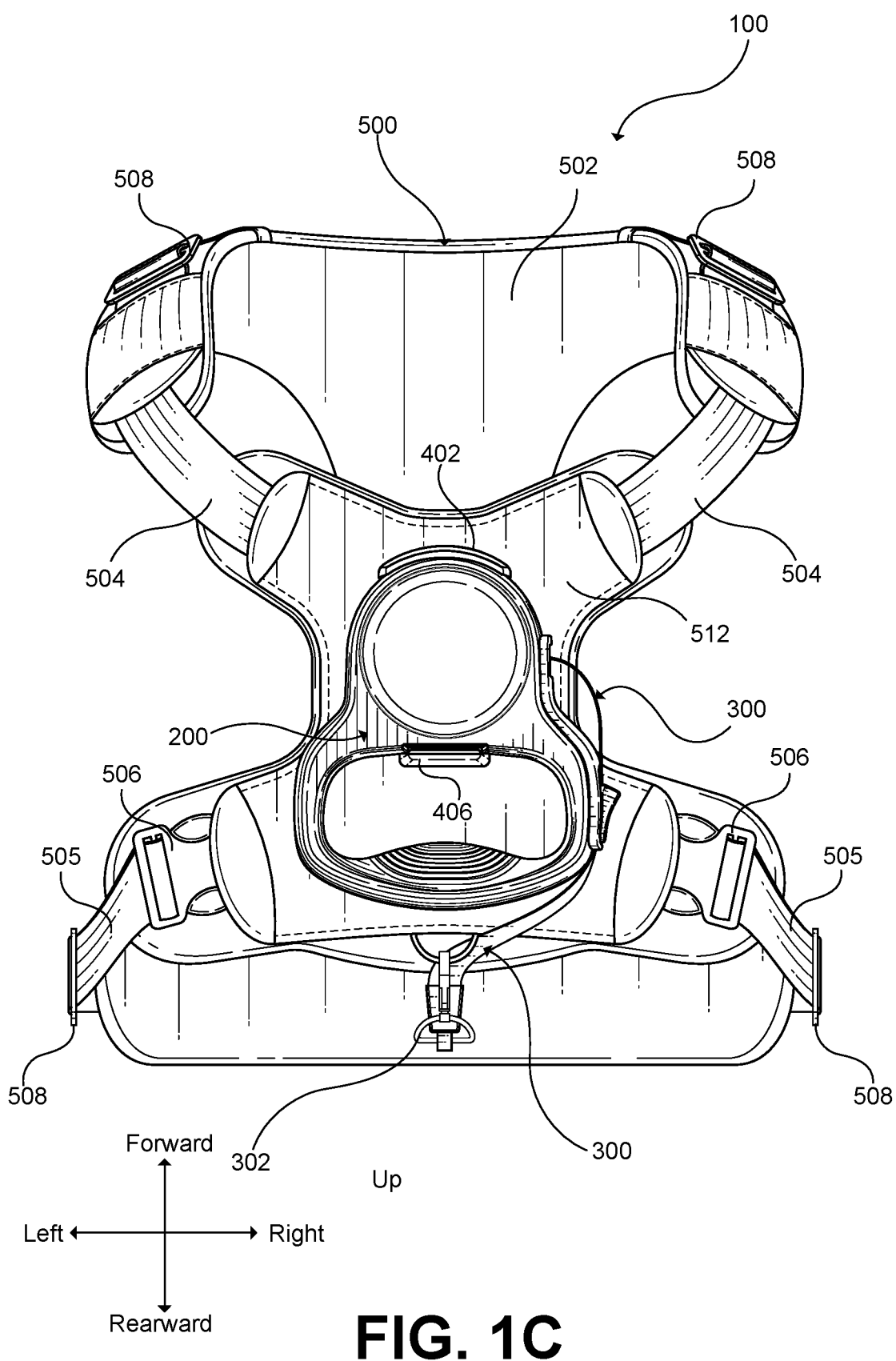
FIG. 1C illustrates another view of an example system in accordance with one or more embodiments of the present disclosure, here depicting a top plan view of an example retractable leash assembly releasably attached to an example complementary receptacle in accordance with one or more embodiments of the present disclosure.
Figure 1D:
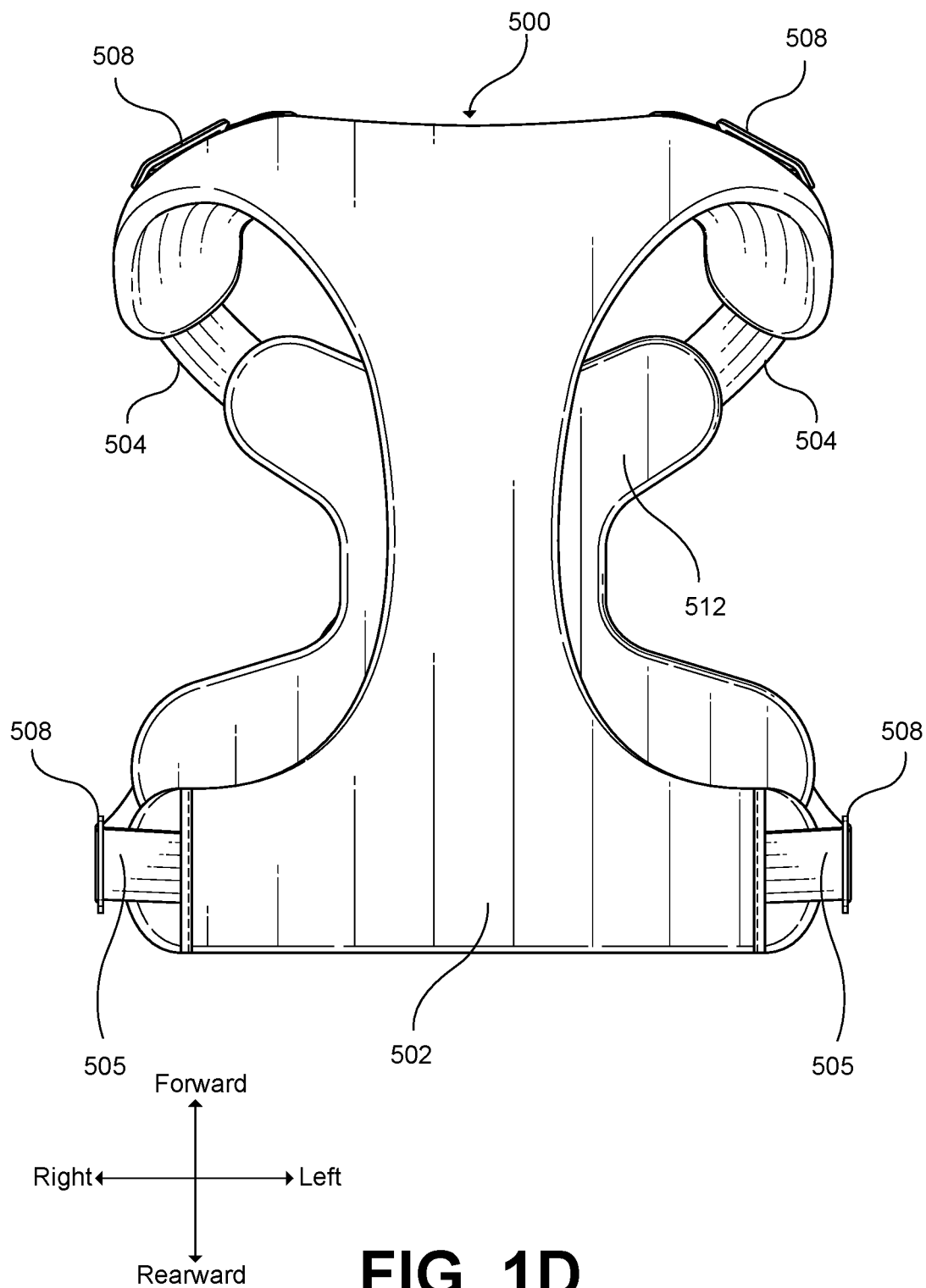
FIG. 1D illustrates another view of an example system in accordance with one or more embodiments of the present disclosure, here depicting a bottom plan view of an example retractable leash assembly releasably attached to an example complementary receptacle in accordance with one or more embodiments of the present disclosure.
Figure 1E:
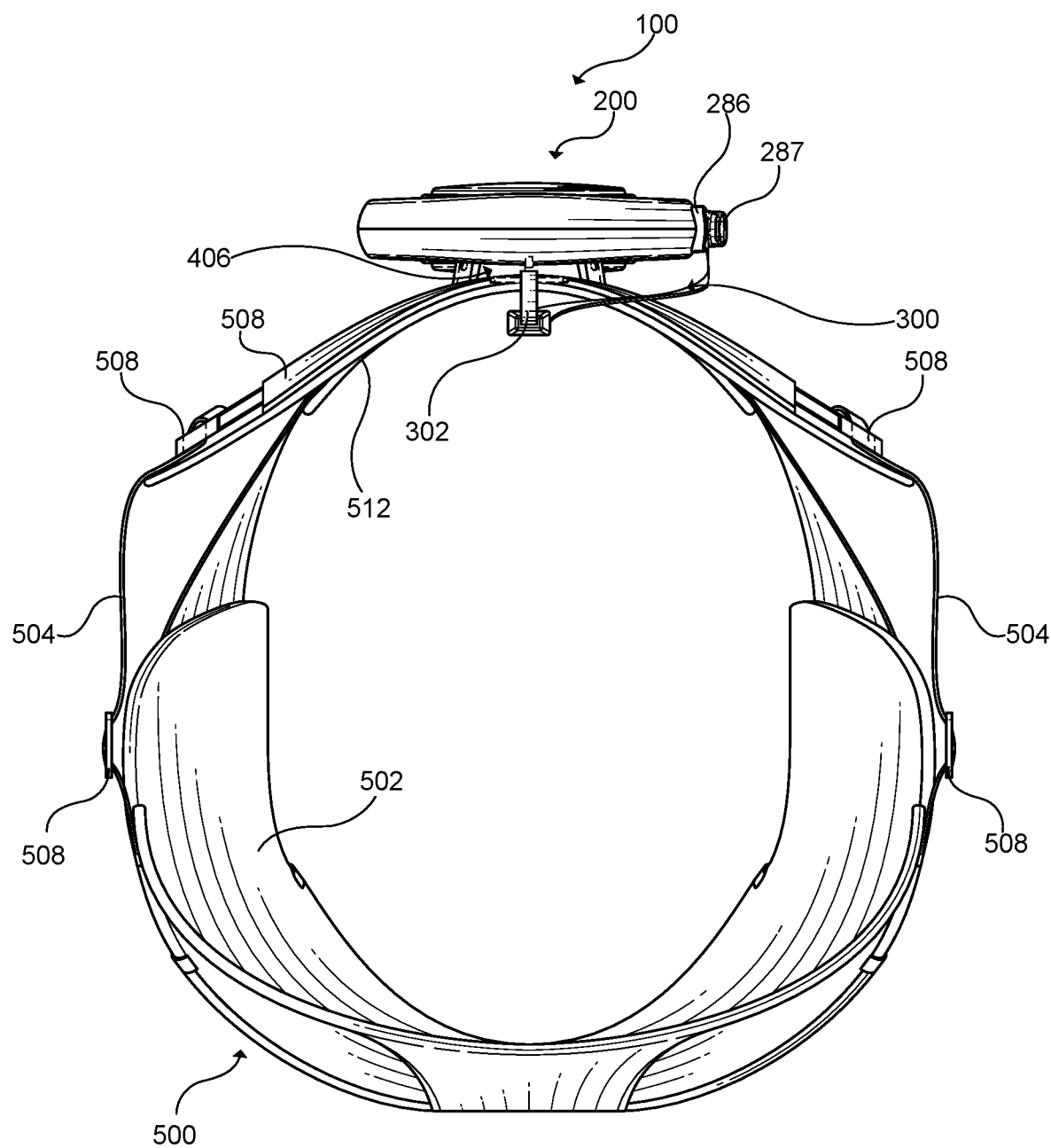
FIG. 1E illustrates another view of an example system in accordance with one or more embodiments of the present disclosure, here depicting a rear side elevation view of an example retractable leash assembly releasably attached to an example complementary receptacle in accordance with one or more embodiments of the present disclosure.
Figure 1E:
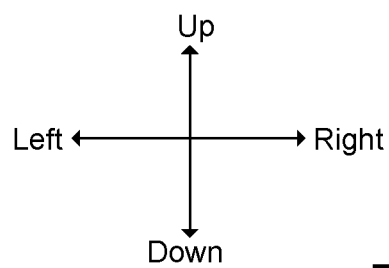
Figure 1F:
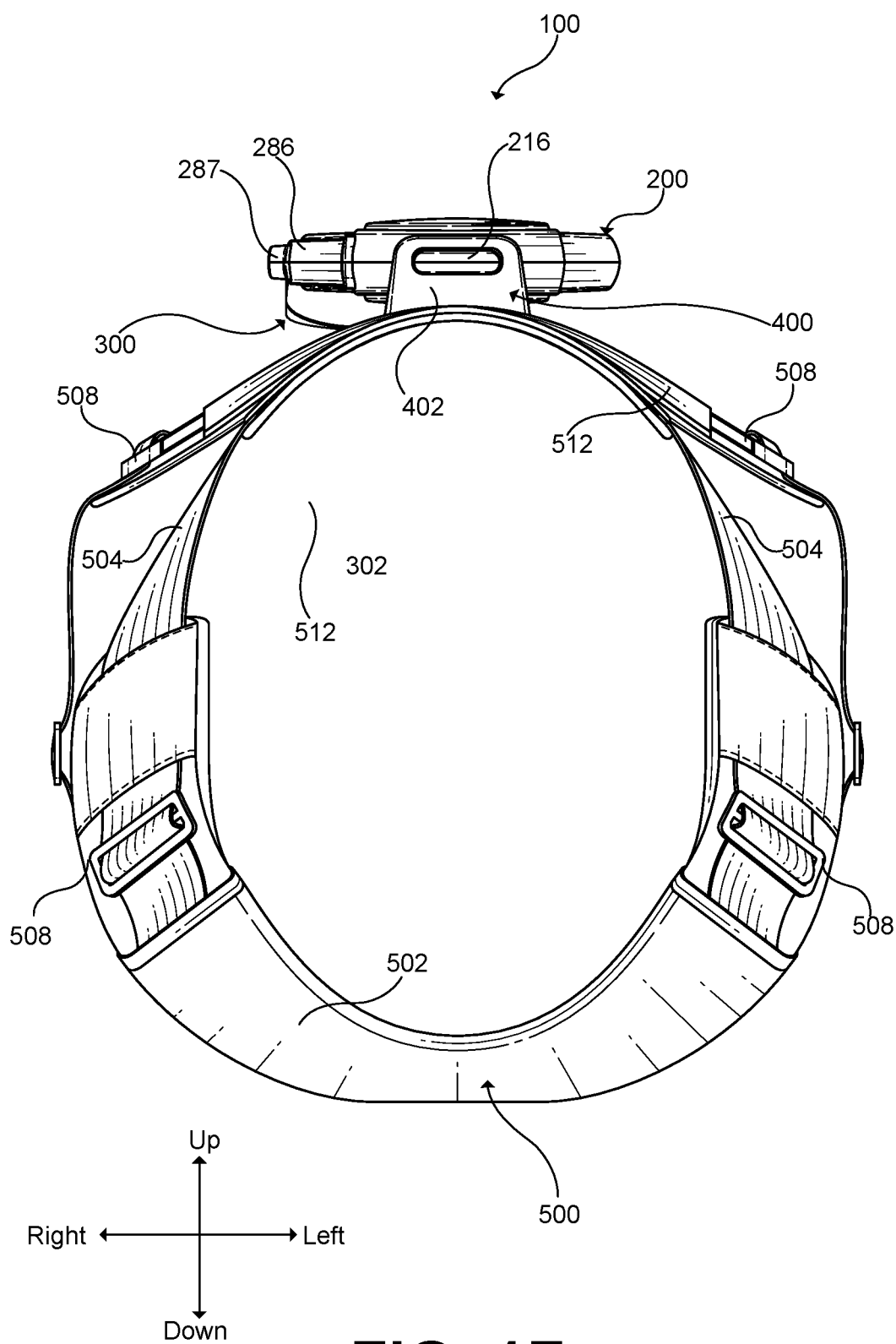
FIG. 1F illustrates another view of an example system in accordance with one or more embodiments of the present disclosure, here depicting a front side elevation view of an example retractable leash assembly releasably attached to an example complementary receptacle in accordance with one or more embodiments of the present disclosure.
Figure 1G:
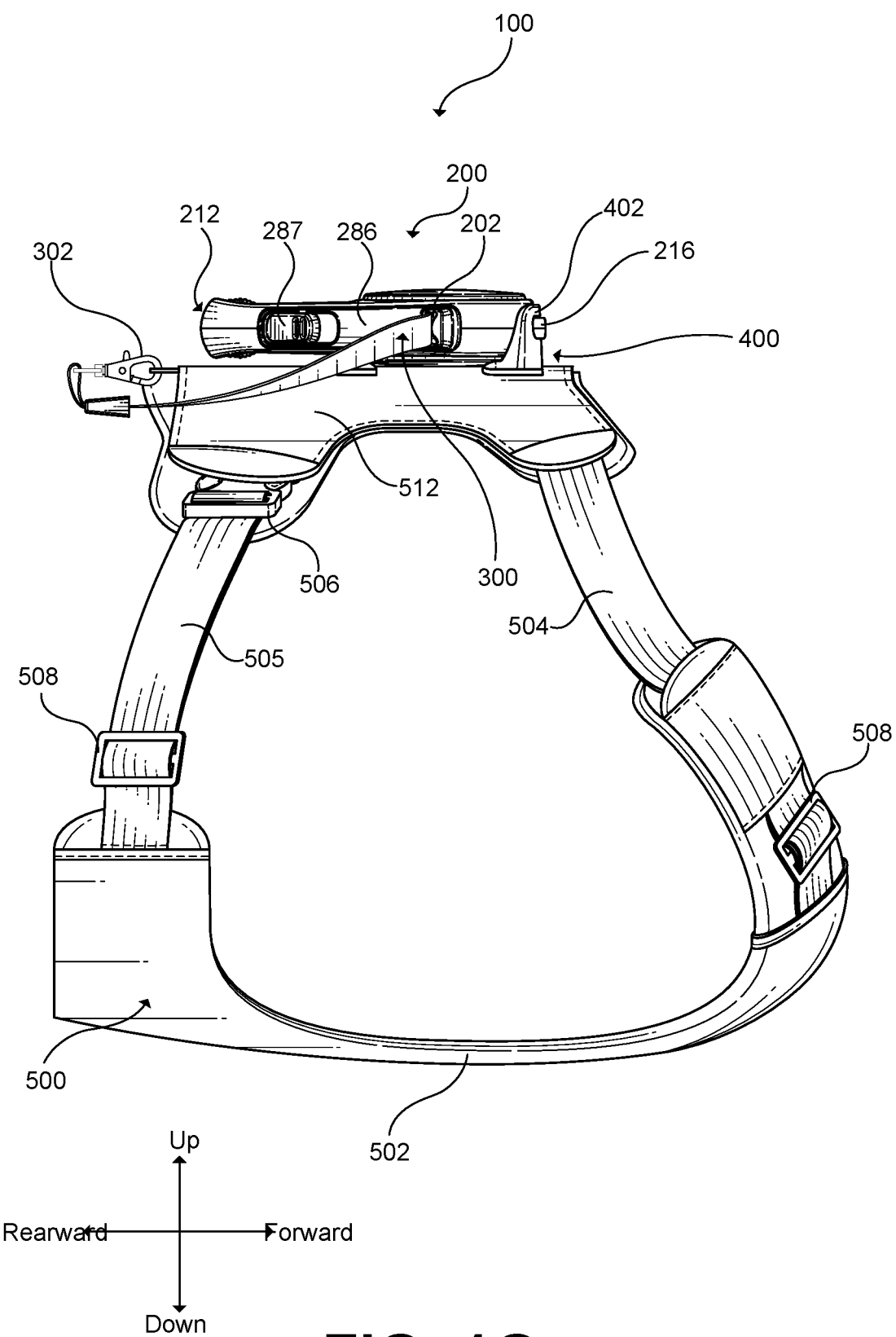
FIG. 1G illustrates another view of an example system in accordance with one or more embodiments of the present disclosure, here depicting a right side elevation view of an example retractable leash assembly releasably attached to an example complementary receptacle in accordance with one or more embodiments of the present disclosure.
Figure 1H:
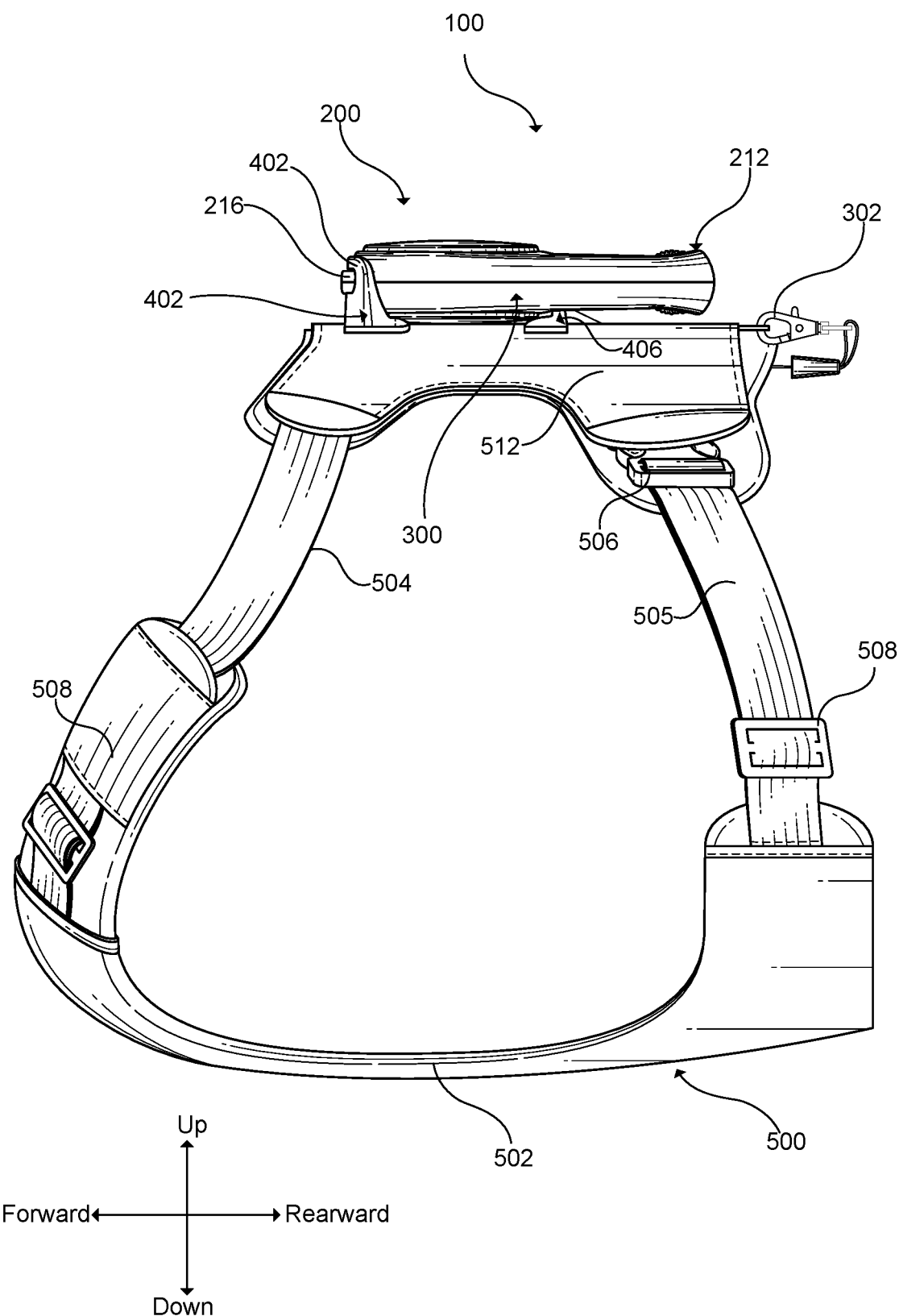
FIG. 1H illustrates another view of an example system in accordance with one or more embodiments of the present disclosure, here depicting a left side elevation view of an example retractable leash assembly releasably attached to an example complementary receptacle in accordance with one or more embodiments of the present disclosure.

FIG. 1B illustrates an example retractable leash assembly 200 detached from and positioned above an example receptacle 400, which is shown here uncoupled with a harness for explanatory purposes (i.e., in a detached condition). The retractable leash assembly 200 and receptacle 400 are shown in a reverse orientation to better illustrate various example features. As shown, retractable leash assembly 200 may generally be described as including a leash enclosure portion 211 and a handle portion 212. The handle portion 212 is formed to create an aperture 214 through which a user may place a portion of their hand, and a grip member 213 protruding into the aperture 214 and configured to provide a user with added positional control of the retractable leash assembly 200, as well as additional comfort and fit with the user's hand. Retractable leash assembly 200 may also include leash enclosure portion 211 that is coupled to or formed integrally with a portion of handle portion 212.

In accordance with some embodiments of the present disclosure, retractable leash assembly 200 may include a first structural feature that is configured to be mated with a first structural feature of receptacle 400. The first structural feature of the retractable leash assembly may include a first rigid formation protruding from at least a portion of the housing of the retractable leash assembly 200, and extending beyond at least a portion of the leash enclosure portion of such housing in at least one radial direction relative to the spool. For example, as shown in FIG. 1A and FIG. 1B, an example for structural feature of the retractable leash assembly 200 may be a rigid formation such as nose 216 that protrudes from a portion of a side wall of the leash enclosure portion 211 of retractable leash assembly 200 that is substantially opposite from the position of the handle portion 212, extending in the forward direction.

In accordance with some embodiments of the present disclosure, retractable leash assembly 200 may include further include a second structural feature that is configured to be mated with a second structural feature of receptacle 400. In accordance with some embodiments of the present disclosure, the second structural feature of the retractable leash assembly may include a depression within the housing that may be aligned with a snap-fit feature of the receptacle. For example, as shown in FIG. 1B, the second structural feature of the retractable leash assembly 200 may include a depression such as a female snap-fit joint 215 formation.

Though the second structural feature of the receptacle leash assembly 200 is shown in FIG. 1B as being located on a portion of the housing defining a part of aperture 214, and in a position substantially opposite of grip 213 within such aperture 214, such a second structural feature of the receptacle leash assembly 200 may be positioned anywhere on or within the housing such that it is accessible to a complementary second structural feature of receptacle 400. The second structural feature of the receptacle 400 may include a male snap-fit joint formation, for example, that is complementary to the example female snap-fit joint 215 formation shown. The second structural feature of the retractable leash assembly 200 and the structural feature of the receptacle 400 should be separably complimentary. For example, and a male snap-fit joint formation on receptacle 400 may be separably complimentary with a female snap-fit joint formation on retractable leash assembly 200.

As further shown in FIG. 1B, receptacle 400 may include one or more rigid members including or defining structural features configured for mating with the first and second structural features of the retractable leash assembly 200. For example rigid formation 402 may extend upward from support plate 404, and be configured to define an aperture 403 that comprises a first structural feature of receptacle 400 that is configured to mate with the first structural feature (e.g., nose 216) when the two are brought in proximity with one another and appropriate forces are applied. Further as shown, rigid formation 406 may extend upward from attachment plate 404, and be configured to define a male snap-fit formation 407, such as a bump or nub, that comprises a second structural feature of receptacle 400 that is configured to mate with the second structural feature of retractable leash assembly 200 when the two are brought in proximity with one another and appropriate forces are applied.

As shown, a first structural feature of the receptacle may be defined by a first aperture formed within a first rigid formation protruding outward from a support plate of the receptacle. The first aperture of the first rigid formation of the receptacle may be fitted to receive and at least partially circumscribe at least a portion of the first rigid formation of the retractable leash assembly. In other embodiments, the first structural feature of the retractable leash assembly 200 may include a depression formation (as an alternative or in addition to a protruding nose 216 formation) on or within at least a portion of the leash enclosure portion of the housing. In some such embodiments, the first structural feature of the receptacle may complementarily include a first protrusion extending from the first rigid formation extending outward from a support plate 404 of the receptacle 400. The first protrusion of the receptacle, in such an embodiment, may be fitted to be positioned within and be at least partially circumscribed by at least a portion of the depression formation of the leash enclosure portion 211 of the housing of a retractable leash assembly. In other words, instead of or in addition to the nose protrusion being formed on the housing of the retractable leash assembly and configured for mating with a depression, slot, hole, cavity, or other aperture in the receptacle, a nose protrusion may be formed on a portion of the receptacle itself and configured for mating with a depression, slot, hole, cavity, or other aperture in the housing of the receptacle leash assembly.

In some embodiments, as noted, the second structural feature of the retractable leash assembly 200 includes a female snap-fit joint 215 formation. Additionally or alternatively, in some embodiments the second structural feature of the receptacle includes a male snap-fit joint formation separably complementary to the female snap-fit joint formation. In some such embodiments, one or more of the female snap-fit joint formation and the male snap-fit joint formation comprise a cantilever snap-fit joint, a U-shaped snap-fit joint, a torsion snap-fit joint, a ball snap-fit joint, and an annular snap joint.

In some embodiments, the second structural feature of the receptacle may include a male snap-fit joint formation complementary to the female snap-fit joint formation where the male snap-fit joint formation and female snap-fit joint formation are separably complimentary. Separably complimentary as used herein refers generally to the ability of two or more matable (sometimes referred to herein as "engageable" or "coupleable") structures to be repeatedly mated and unmated (or engaged and disengaged, or coupled and uncoupled) upon application of a sufficient force bringing the two or more together or drawing two for more apart. For example, as it pertains to the snap-fit joints discussed here, separably complimentary generally refers to the ability of the male snap-fit joint formation and the female snap-fit formation to be mated and unmated (e.g., coupled and uncoupled) upon application of a sufficient force in a first and second direction, respectively, without causing a substantial plastic deformation (e.g., inelastic deformation) in one or more of the structures that define the male snap-fit joint formation and the female snap-fit formation.

In some embodiments, the second structural feature of the retractable leash assembly may include a female snap-fit joint formation. The second structural feature of the receptacle may include a male snap-fit joint formation complementary to the female snap-fit joint formation; and the male snap-fit joint formation and female snap-fit joint formations may be separably complimentary.

In some embodiments, the male snap-fit joint formation includes a partially deflectable cantilever member having a first protrusion, and wherein the female snap-fit joint formation includes a first depression configured to receive at least a portion of the first protrusion of the cantilever member during a joining operation. During an example joining operation the cantilever member may be partially deflected as it is forced along a surface proximal to the first depression. In some embodiments, during an example joining operation, such an example cantilever member at least partially recovers from the deflection when the protrusion of the cantilever member is substantially aligned with a first depression region of an female snap-fit formation.

In some embodiments, the first protrusion of an example cantilever member of a second structural feature of an example receptacle (or, alternatively or additionally, a first protrusion of an example cantilever member of a second structural feature of an example housing of a retractable leash assembly) may include one or more of a hook structure, a stud structure, and a bead structure.

In accordance with some embodiments of the present disclosure, a depression formation in the leash enclosure portion of the housing of a retractable leash assembly (or, alternatively or additionally, a depression formation in the second structural feature of a receptacle assembly) may include one or more of a hole formation, an undercut formation, and a countersink formation. In some embodiments, the first structural feature of the retractable leash assembly comprises one or more of a countersink, hole, and undercut formation located within at least a portion of the leash enclosure portion of the housing in at least one radial direction relative to the spool. And in some such embodiments, the first structural feature of the receptacle comprises a first protrusion from a rigid formation extending outward from a support plate of the receptacle, the first protrusion fitted to be positioned within and at least partially circumscribed by at least a portion of one or more of the countersink, hole, and undercut formation.

In some embodiments, the male snap-fit joint formation and the female snap-fit joint formation are invertably complementary as well as separably complimentary. Invertably complimentary, as used in connection with two or more matable (sometimes referred to herein as "engageable" or "coupleable") structures herein, refers generally to the ability of the structures be mated and unmated (or engaged and disengaged, or coupled and uncoupled) in a similar fashion when one such structure approaches the other such structure in either of at least two orientations (e.g., right-side up, or upside-down, or otherwise flipped about given axis) during a joining operation, the one orientation referred to as being "inverted" relative to the other(s).

In some embodiments, an attached condition may be achieved between an example retractable leash assembly 200 and an example receptacle 400 when both: the first structural feature of the retractable leash assembly is mated with the first structural feature of the receptacle, and the second structural feature of the retractable leash assembly is mated with the second structural feature of the receptacle. Conversely, a detached condition may be achieved between an example retractable leash assembly 200 and an example receptacle 400 when both: a mated condition between first structural feature of the retractable leash assembly and the first structural feature of the receptacle is disengaged, and a mated condition between the second structural feature of the retractable leash assembly and the second structural feature of the receptacle is disengaged.

In some embodiments, beginning with an example retractable leash assembly 200 in a detached condition with respect to the receptacle 400 (as shown in FIG. 1B), application of a force on the retractable leash assembly 200 that may otherwise cause at least a portion of the retractable leash assembly 200 to move in a second direction (e.g., substantially downward)—and to thereby engage a mated condition between the second structural feature of the retractable leash assembly 200 and the second structural feature of the receptacle 400—is substantially prohibited until the first structural feature of the retractable leash assembly 200 and the first structural feature of the receptacle 400 are in a mated condition pursuant to a movement in a first direction (e.g., substantially forward).

In accordance with some embodiments, in the attached condition (as shown in FIG. 1A) the retractable leash assembly is held in a substantially fixed position relative to the position of the receptacle.

In some embodiments, beginning with an example retractable leash assembly 200 in an attached condition with respect to the receptacle 400 (as shown in FIG. 1A), application of a force on the retractable leash assembly may cause at least a portion of the retractable leash assembly to move in a third direction (e.g., substantially upward) and cause the mated state between the second structural feature of the retractable leash assembly and the second structural feature of the receptacle to become disengaged. In some examples disclosed herein, such an application of a force on the retractable leash assembly is achieved when a user grips a handle portion (which may include grip 213) of the retractable leash assembly 200 and lifts upward.

In some embodiments, application of a force on the retractable leash assembly 200 may cause at least a portion of the retractable leash assembly 200 to move in a fourth direction (e.g., substantially backward/rearward) and cause the mated state between the first structural feature of the retractable leash assembly 200 and the first structural feature of the receptacle 400 to disengage. In some examples disclosed herein, such an application of a force causing at least a portion of the retractable leash assembly 200 to move in the fourth direction is a substantially smaller force than application of force causing at least a portion of the retractable leash assembly 200 to move in the third direction. Indeed, in some embodiments, the structural relationship between the first structural feature of the retractable leash assembly 200 and the first structural feature of the receptacle 400 may allow the retractable leash assembly 200 to pivot (e.g., about the mating region of said first structural features) as the application of force causing the retractable leash assembly 200 to move in the third direction occurs, the pivot movement itself (alone or together with other movements) generating the application of force sufficient to cause at least a portion of the retractable leash assembly 200 to move in the fourth direction.

Though the application of force to cause the retractable leash assembly to move in the fourth direction may in some examples be small in comparison to the application of force to cause the retractable leash assembly to move in the third direction (assuming such force is applied to move the retractable leash assembly in the third direction), it should be noted that in accordance with some embodiments such movements in the fourth direction may be prohibited unless and until they move in in the third direction has taken place. That is, beginning with the retractable leash assembly in attached condition with respect to the receptacle, in accordance with some embodiments an application of a force on the retractable leash assembly causing at least a portion of the retractable leash assembly to move in the fourth direction (e.g., substantially rearward to disengage nose 216 with the structure forming aperture 403) is substantially prohibited until the second structural feature of the retractable leash assembly 200 and the second structural feature of the receptacle 400 achieve an unmated condition pursuant to a movement in a third direction (e.g., substantially upward).

In some embodiments, application of a force directly or indirectly on the second structural feature of the receptacle 400 (e.g., not directly on the second structural feature of the retractable leash assembly 200) may disengage a mated condition between a second structural feature of the receptacle 400 and a second structural feature of the retractable leash assembly 200. For example, in some embodiments a user may disengage a mated condition between a second structural feature of the receptacle 400 and a second structural feature of the retractable leash assembly 200 by applying a pushing or pulling force on the second structural feature of the receptacle 400 with, for example, their finger.

In some embodiments, the first direction and the second directions discussed above are in different directions; in some instances the first direction and the second direction are substantially orthogonal relative to each other in at least one plane; in some instances the angle between the first direction and the second direction is between 10° and 170° degrees in at least one plane. Similarly, in accordance with some embodiments, the third direction and the fourth direction are different directions; in some instances, the third direction and the fourth direction are substantially orthogonal relative to each other in at least one plane; and in some instances the angle between the third direction and the fourth direction is between 10° and 170° degrees in at least one plane.

Although not shown explicitly in FIG. 1B, retractable leash assembly 200 and receptacle 400 may be configured with one or more guiding elements that bias their complementary mating features into an aligned or mated position with respect to one another. For example, guiding magnets may be disposed on or embedded within a portion of the retractable leash assembly 200 and receptacle 400 in an arrangement that influences the position of the retractable leash assembly 200 as it is brought in proximity with receptacle 400 attachment (e.g., to achieve a mated condition). Such guiding magnets may aid a user with an otherwise unsteady hand as said user attempts to perform a joining operation to attach the retractable leash assembly 200 with a receptacle 400 coupled to a harness. Such guiding elements may, for example, bias a first structural feature of the retractable leash assembly 200 toward an aligned or mated position with respect to the first structural feature of receptacle 400. Concurrently, or thereafter (timing triggered by a first mating condition being detected, for example), other guiding elements may, for example, bias a second structural feature of the retractable leash assembly 200 toward an aligned or mated position with respect to the second structural feature of receptacle 400.

Furthermore, although not shown explicitly in FIGS. 1A and 1B, one or more of retractable leash assembly 200, receptacle 400, and harness 500 may be equipped with one or more of a computing module, a power source, sensors, and other electronic devices. Sensors may detect one or more conditions of the animal, or the environment the animal is within. Various sensors and electronic devices may be used, alone or in combination with a communications interface of the computing components, to enable a human user to obtain, for example, location information about the animal to which the harness is attached. For example, retractable leash assembly 200 may be equipped with a computing module coupled with one or more of a GPS circuit, a Bluetooth circuit, a cellular communications circuit, a speaker, and a light emitting device. The computing module may be configured to obtain GPS location information via the GPS circuit, and transmit a representation of such data to a user's computing device (e.g., smartphone). This way, if a user attaches retractable leash assembly 200 to the harness 500 via a receptacle 400 to allow their animal to run free in a park, for example, but then later loses the animal upon the animal escaping from the park, the user may relocate the animal by observing the GPS location information transmitted to his/her smart phone via the computing module coupled with the retractable leash assembly 200.

FIGS. 1C-1H depict additional views of the example system shown in FIG. 1A, with the retractable leash assembly 200 in an attached condition with respect to the receptacle 400 and harness 500. FIGS. 1C, 1D, 1E, 1F, 1G, and 1H depicting a top plan view, a bottom plan view, a rear side elevation view, a right side elevation view, a front side elevation view, a left side elevation view, respectively, of an example retractable leash assembly releasably attached to an example complementary receptacle in accordance with one or more embodiments of the present disclosure. FIGS. 1C through 1H depict various features and elements that may be deployed in one or more embodiments of the present disclosure from different perspectives. These figures are discussed together in connection with the same, with like numerals representing like elements and features.

As shown, harness 500 may include a back pad 512 and an undercarriage pad 502, where the back pad 512 may be configured to cover at least a portion of the back of an animal when the harness 500 is worn, and the undercarriage pad 502 may be configured to cover at least a portion of the chest of an animal when the harness 500 is worn. In some embodiments, at least a portion of the back pad 512 and the undercarriage pad 502 are nonrigid (i.e., at least partially flexible) such that either or both may adapt to the form of the animal's body to which the harness 500 is to be attached. In some embodiments, the harness is equipped with one or more front straps 504, the one or more front straps connecting a forward/frontal portion of the back pad 512 to a forward/frontal portion of the undercarriage pad 502. In some embodiments, harness 500 may be equipped with one or more rear straps 505, the one or more rear straps 505 connecting a rear portion of the back pad 512 to a rear portion of the undercarriage pad 502.

As the technology of the present disclosure is intended and adaptable for use with any shape or size of animal, in some embodiments harnesses of the present disclosure may be equipped with adjustable straps. For example, one or more of the front straps and rear straps may be adjustable in length. In another example, one or more of the front straps and rear straps may be made, in whole or in part of elastomeric materials to provide additional flexibility as an animal moves about. Additionally or alternatively, and as shown in the figures by way of example, in some embodiments one or more of the front straps 504 and rear straps 505 connect to one or more of the front portion and the rear portion of one or more of the back pad 512 and undercarriage pad 512 via one or more releasable couples, such as slide-release buckle 506. Additionally or alternatively, one or more of the front straps 504 and rear straps 505 may be adjustable via one or more of adjustment mechanisms such as a slider adjusters 508. Such adjustment mechanisms may include any type of such mechanism, including one or more of a ladder-lock adjuster, a hook and loop fastener, and an adjustable buckle fastener.

As shown, in some embodiments receptacle 400 it is attached to or otherwise coupled with harness 500 via a support plate such as support plate 404 (shown in FIG. 1B). In some embodiments, such support plate of the receptacle 400 is attached to or otherwise coupled with the back pad 512 of the harness 500. For example, back pad 512 may be comprised of several layers of material and, during a manufacturing procedure, for example, such layers of material may be sewn together with at least a portion of support plate 404 situated between two or more such layers of material. In this way, support plate 404 may be embedded within back pad 515 of harness 500 in a substantially permanent fashion. In some embodiments support plate 404 of receptacle 400 may be attached to or otherwise coupled with harness 500 using releasable or nonreleasable fasteners. In some embodiments support plate 404 of receptacle 400 may be attached to or otherwise coupled with harness 500 using releasable or nonreleasable adhesives. In some embodiments the attachment or couple is permanent, while in other embodiments the attachment or couple is releasable to enable detachment under certain conditions (e.g., application of a sufficient release force). In some embodiments, the support plate of the receptacle is attached to the non-rigid back pad, and at least a portion of one or more of the first structural feature of the receptacle and the second structural feature of the receptacle protrude from the support plate in a substantially perpendicularly direction in at least one plane, including a plane tangent to at least a portion of the support plate), or in substantially perpendicular direction is substantially vertical relative to the earth's surface when the harness is attached to a four-legged standing animal.

FIGS. 1C-1H also include various perspective views where one or more example features discussed with reference to FIGS. 1A-1B and 2A-2C may also be seen—with like numerals corresponding to like features—in accordance with one or more embodiments of the present disclosure. For example at least a portion of first rigid formation 402 and second rigid formation 406 of receptacle 400 (which define and in some instances may be said to comprise a first structural feature (e.g., aperture 403) and second structural feature/s (cantilever 407, male snap-fit formation 408) of receptacle 400); and at least a portion of an example first structural feature (e.g., nose 216) and second structural feature (e.g., female snap-fit formation 215) may be seen in one or more of FIGS. 1A-1B and 2A-2C, with like numerals corresponding to like features for convenience and clarity.

Figure 2A:
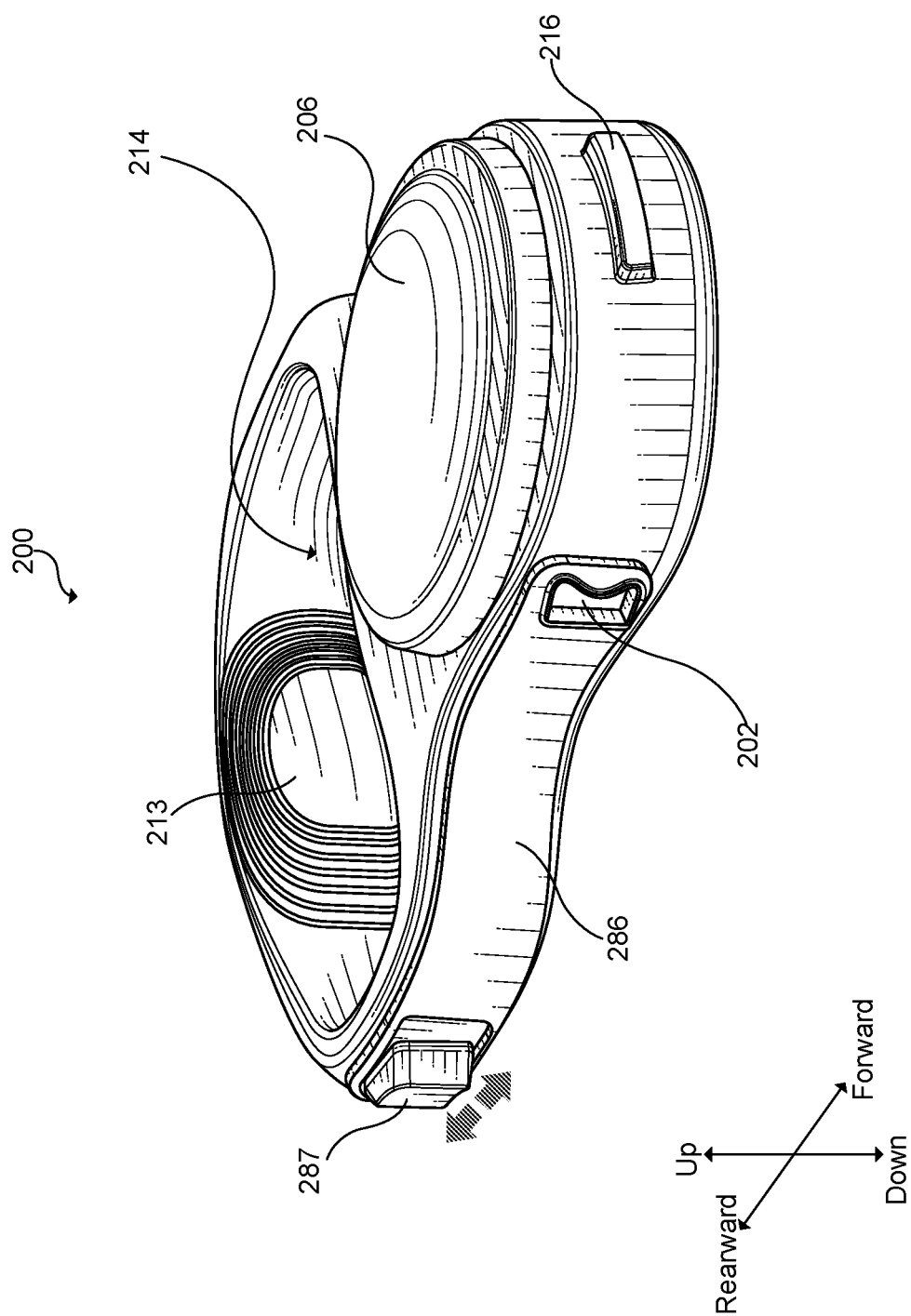
FIG. 2A illustrates a perspective view of an example retractable leash assembly in accordance with one or more embodiments of the present disclosure.
Figure 2B:
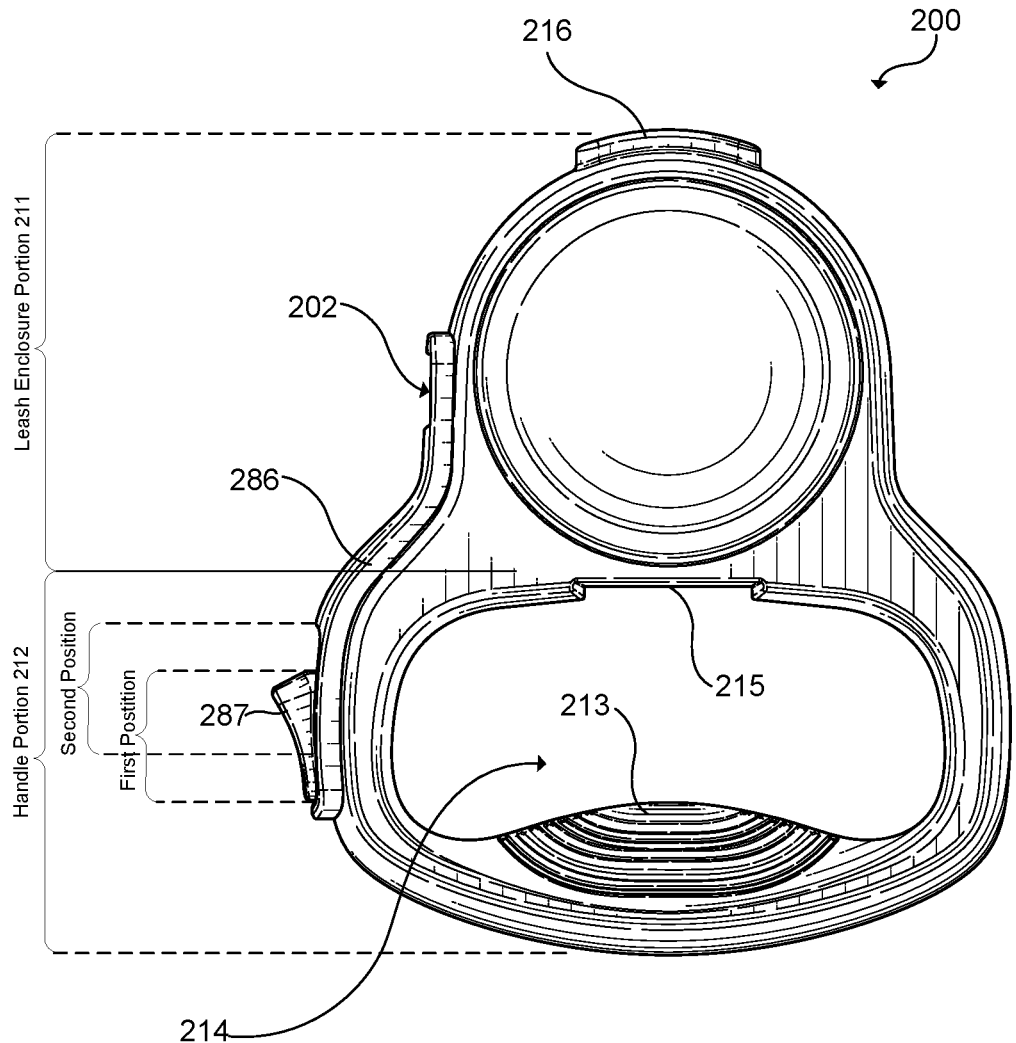
FIG. 2B illustrates a top plan view of an example retractable leash assembly in accordance with one or more embodiments of the present disclosure.
Figure 2B:
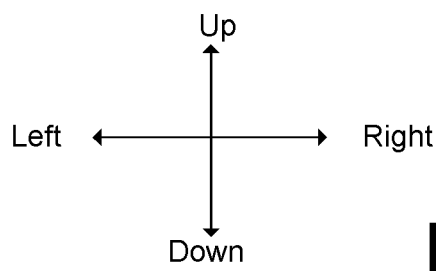
Figure 2C:
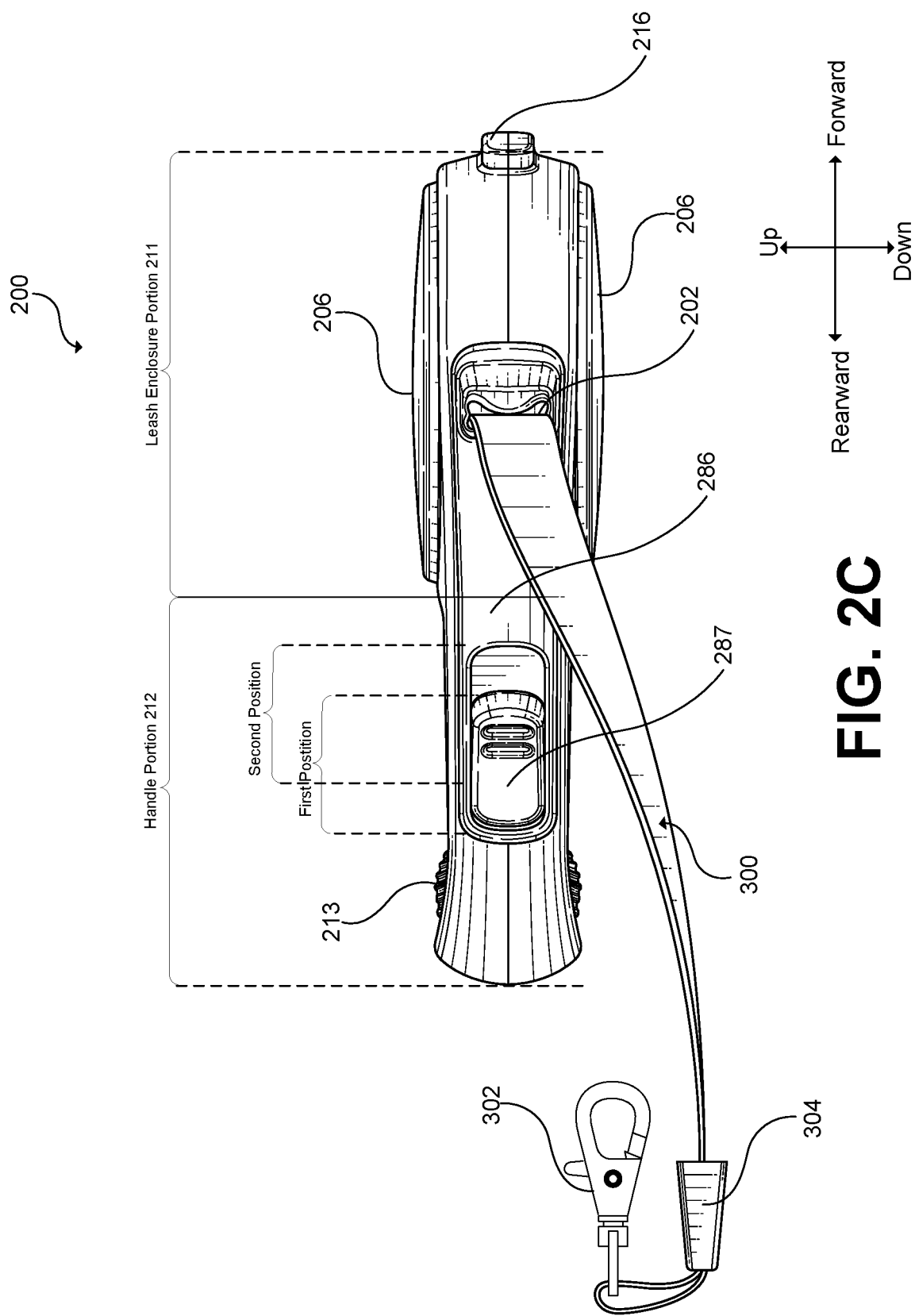
FIG. 2C illustrates a right side elevation view of an example retractable leash assembly in accordance with one or more embodiments of the present disclosure.

Turning now to a discussion referring more particularly to example retractable leash assembly features in accordance with one or more embodiments of the present disclosure, FIGS. 2A-2C are provided to illustrate external views of example retractable leash assemblies that depict some examples of such one or more such features. In particular, FIGS. 2A, 2B, and 2C illustrate a perspective view, a top plan view, and a right side elevation view, respectively, of example retractable leash assemblies 200 in accordance with one or more embodiments of the present disclosure. FIGS. 2A and 2B are shown without a connected so as to reveal certain features without obstruction, while FIG. 2C is shown with a connected leash in an exemplary embodiment.

As shown in FIGS. 2A-2C retractable leash assembly 200 may generally be described as having a housing that includes a leash enclosure portion 211 and a handle portion 212. The handle portion 212 is formed to create an aperture 214 through which a user may place a portion of their hand, and a grip member 213 protruding into the aperture 214 and configured to provide a user with added positional control of the retractable leash assembly 200, as well as additional comfort and fit with the user's hand. Retractable leash assembly 200 may also include leash enclosure portion 211 that is coupled to or formed integrally with a portion of handle portion 212. Retractable leash assembly 200 may also include a first and second structural feature configured to mate with a first and second structural feature of a receptacle attached to a harness, as discussed elsewhere herein.

Leash enclosure portion 211 of retractable leash assembly 200 may include one or more of a top cover 206 or a bottom cover 206 that may be releasably coupled with the remainder of the housing of the retractable leash assembly 200. Top cover 206 or bottom cover 206 may be removable (e.g., threaded release, snap-fit release, etc.) to reveal one or more of the internal components of retractable leash assembly 200. Such releasably coupled top and bottom covers of retractable leash assembly 200 permit easy replacement or repair of internal devices, including any electronic devices that may be closed within such a housing, as discussed herein.

As shown, retractable leash assembly 200 may include an actuation assembly configured to enable a user to actuate one or more functional features of retractable leash assembly 200 (for example, the novel locking assembly disclosed herein) by moving one or more components or elements of the actuation assembly from a point external to the housing. The actuation assembly may comprise a slider 287 (or other actuatable element such as a button, a trigger, or the like) movably mounted to remaining elements of retractable leash assembly 200 the mouth bridge 286. Mouth bridge 286 may include embedded tracks or bearing mechanisms enabling slider 287 to move forward and backward upon application of a moving force in such directions. Mouth bridge 286 may be coupled to or integrally formed with the remaining portions of the housing of the retractable leash assembly 200. Mouth bridge 286 is configured to allow movements of slider 287 into one or more positions that cause a locking assembly held within the housing of the retractable leash assembly 200 to engage or disengage.

Retractable leash assembly 200 may also include an orifice (e.g., leash-hole 202) allowing passage of a leash 300 (or other cord or strap, as desired) therethrough in connection with the leash being drawn out of the retractable leash assembly 200 during use, for being retracted back into the retractable leash assembly 200 upon user disengagement of the locking assembly via movement of slider 287 from a first position into a second position, or vice versa. For example, slider 286 may be movable from a first slider position into a second slider position, and with such movement cause an internal actuator tang coupled to a portion of an internal locking assembly (e.g., a release ring, introduced in FIG. 3A) to move in a manner that disengages the internal locking assembly. Upon disengagement of such an internal locking assembly, week 300 may be caused to retracted back into the enclosure created by the housing of retractable leash assembly 200.

FIG. 2C illustrates such a leash 300, depicting a portion of the leash 300 disposed outside the housing of the retractable leash assembly 200 and leading inside the housing of the retractable leash assembly 200 through leash-hole 202. Leash 300 may include or be otherwise coupled with a clasp 302. Clasp 302 may be configured to attach onto an element of harness 500, such as through a loop or ring affixed to harness 500. In some embodiments, a second end of the leash is coupled to a clasp outside the housing, and the clasp has at least one dimension that is larger than at least one dimension of the orifice through the housing to prohibit the clasp from passing through such orifice. In some embodiments, a second end of the leash is coupled to a stopper 304 outside the housing, and the stopper 304 has at least one dimension that is larger than at least one dimension of the orifice through the housing to prohibit the clasp and/or the stopper 304 from passing through the orifice. In some embodiments, the clasp is configured specifically for attachment to a portion of one or more embodiments of the harnesses or leash receptacles of the present disclosure (e.g., via a keyed attachment mechanism, a magnetic key). In some embodiments, the clasp is configured to prevent or otherwise discourage attachment to a traditional neck collar of an animal (e.g., via a keyed attachment mechanism, a magnetic key ill-suited for attachment to a traditional collar).

In some embodiments, as shown, the outer surface of the housing of the retractable leash assembly is substantially symmetrical about at least one plane. In still further embodiments, the outer surface of the housing of the retractable leash assembly is substantially symmetrical about at least two orthogonal planes. In some embodiments, the outer surface of the housing of the retractable leash assembly is substantially symmetrical about at least one plane, and the at least one plane is substantially parallel with the plane of rotation of the spool.

In accordance with some embodiments of the present disclosure, the retractable leash assembly 200 may enclose various components or elements, discussed in further detail herein with respect to FIGS. 3A-3E.

Figure 3A:
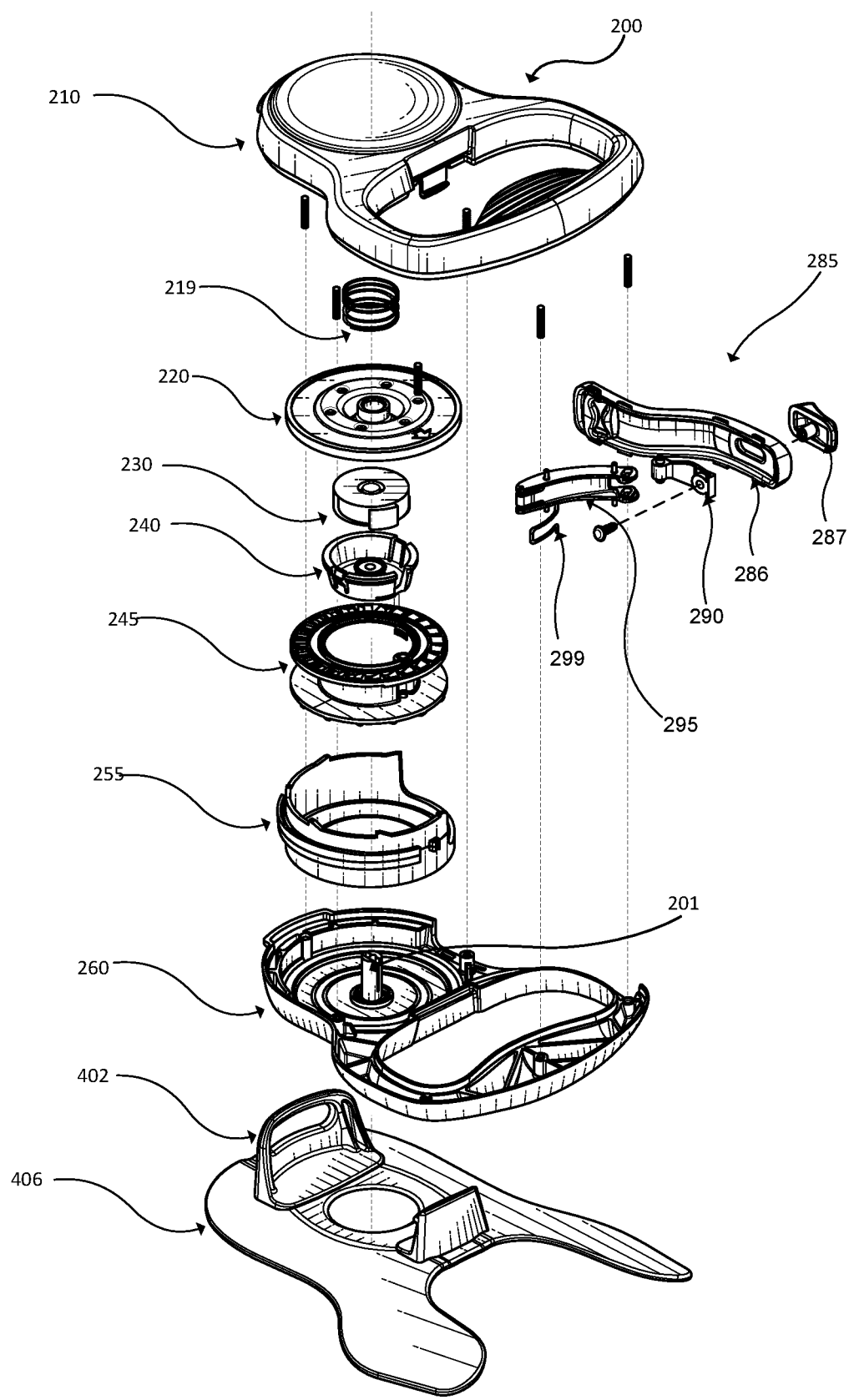
FIG. 3A illustrates an exploded view of an example retractable leash assembly in accordance with one or more embodiments of the present disclosure.

FIG. 3A illustrates an exploded view of an example retractable leash assembly 200, disclosing various features of an internal locking mechanism that may be employed in accordance with one or more embodiments present disclosure. As shown, the retractable leash assembly 200 is equipped with an internal subsystem (which may also referred to herein as a "system"), comprising a lock assembly. The locking assembly systems and subsystems of the present disclosure configured to enable controlled release and retraction of a leash responsive to various movements of an actuator. As will be appreciated upon reviewing the disclosure of such locking assembly subsystems herein, the unique arrangements of elements that may be deployed consistent with one or more embodiments of the present disclosure enable a much more compact, efficient, controllable, retainable, consolidated, and functionally superior retractable leash assemblies as compared to conventional products.

As may be observed from FIG. 3A, retractable leash assembly 200 may include a locking assembly situated between a first housing member 210 and a second housing member 260. In some embodiments of the present disclosure, the lock assembly subsystem may include one or more of: a first support 210 (e.g., a top half of an example retractable leash assembly 200 housing, in this example); a second support 260 (e.g., a bottom half of an example retractable leash assembly 200 housing, in this example); a clutch spring 219; and engagement plate 220; a clock spring 230; a clock spring retainer 240; a leash spool 245; a release ring 255; an actuation assembly 285; and various pins and fasteners. Actuation assembly 285 may include one or more of a slider 287 (or other type of actuation mechanism such as a button or trigger), a mouth bulge 286 (which in some instances may also be considered part of the housing of the retractable leash assembly 200), a slider linkage member 290, and actuator tang 295, and an actuator wireform 299 configured for attachment to release ring 255.

As shown, an axle structure 201 may be provided which, when the retractable leash assembly is assembled, may extend at least partially between a portion of a first support 210 and a portion of a second support. The axle structure 201 may provide or otherwise define an axis of rotation. In some embodiments such an axle structure 201 may be a distinct component coupled with one or more features of the second support 260 (or first support 210, depending on the configuration). In other embodiments, such an axle structure 201 may be an integral formation within the structure of the second support 260 (or first support 210, depending on the configuration). For ease of description, in the present example the first support 210 is provided by a top portion of the housing of an example retractable leash assembly 200, and the second support 260 is provided by a bottom portion of the housing of an example retractable leash assembly 200. While this is not necessary, it provides a convenient embodiment of the present disclosure. Many features of such an example housing have already been introduced herein with reference to FIGS. 1A through 2C, and for brevity will not be repeated here.

Figure 3B:
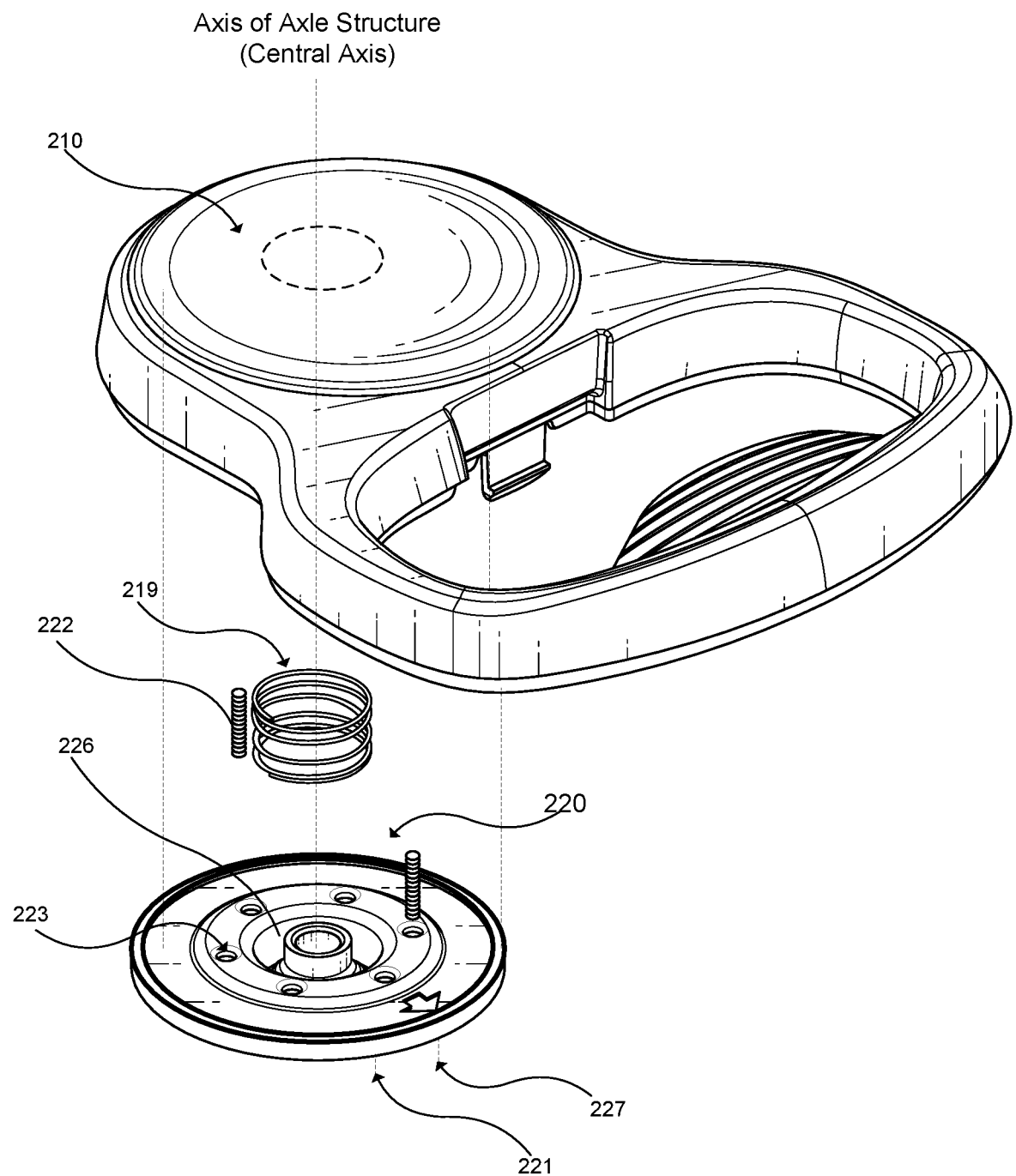
FIG. 3B illustrates a portion of the exploded view depicted in 3A, in accordance with one or more embodiments of the present disclosure.

FIG. 3B illustrates an exploded view of an example first support 210, the clutch spring 219, and engagement plate 220 introduced in FIG. 3A, in accordance with one or more embodiments of the present disclosure.

Engagement plate 220 is configured to be rotatably fixed relative to the first support 210 in the assembled condition, yet be laterally translatable between a first engagement position and a second engagement position in a direction parallel to the axis of rotation. To enable the rotatably fixed and laterally translatable ability, engagement plate 220 may be configured with two or more through-holes 223 that fit around two or more pins 222 that are fixed to the first support 210. The through-holes 223 of engagement plate 220 may be configured to allow the engagement plate 220 to slide up and down the pins 222 responsive to forces applied on the engagement plate 220. Engagement plate 220 may be formed with a clutch spring seat configured to hold or otherwise restrain an end of a clutch spring 219. In an assembled condition, clutch spring 219 is sandwiched between engagement plate 220 and first support 210 such that the clutch spring 219 applies a substantially constant force on the engagement plate 220, biasing the engagement plate 224 translation along pins 222 in a direction away from the first support 210. Although not shown explicitly in FIG. 3B, the engagement plate 220 comprises one or more tooth protrusions 221 on a side opposite the first support 210, and may also include one or more ramp recesses 227 on a side opposite the first support 210. In some embodiments, the ramp recesses are positioned further from the center of the engagement plate (the center being substantially aligned with the axle structure's axis of rotation, as shown) than the tooth protrusions.

Figure 3C:
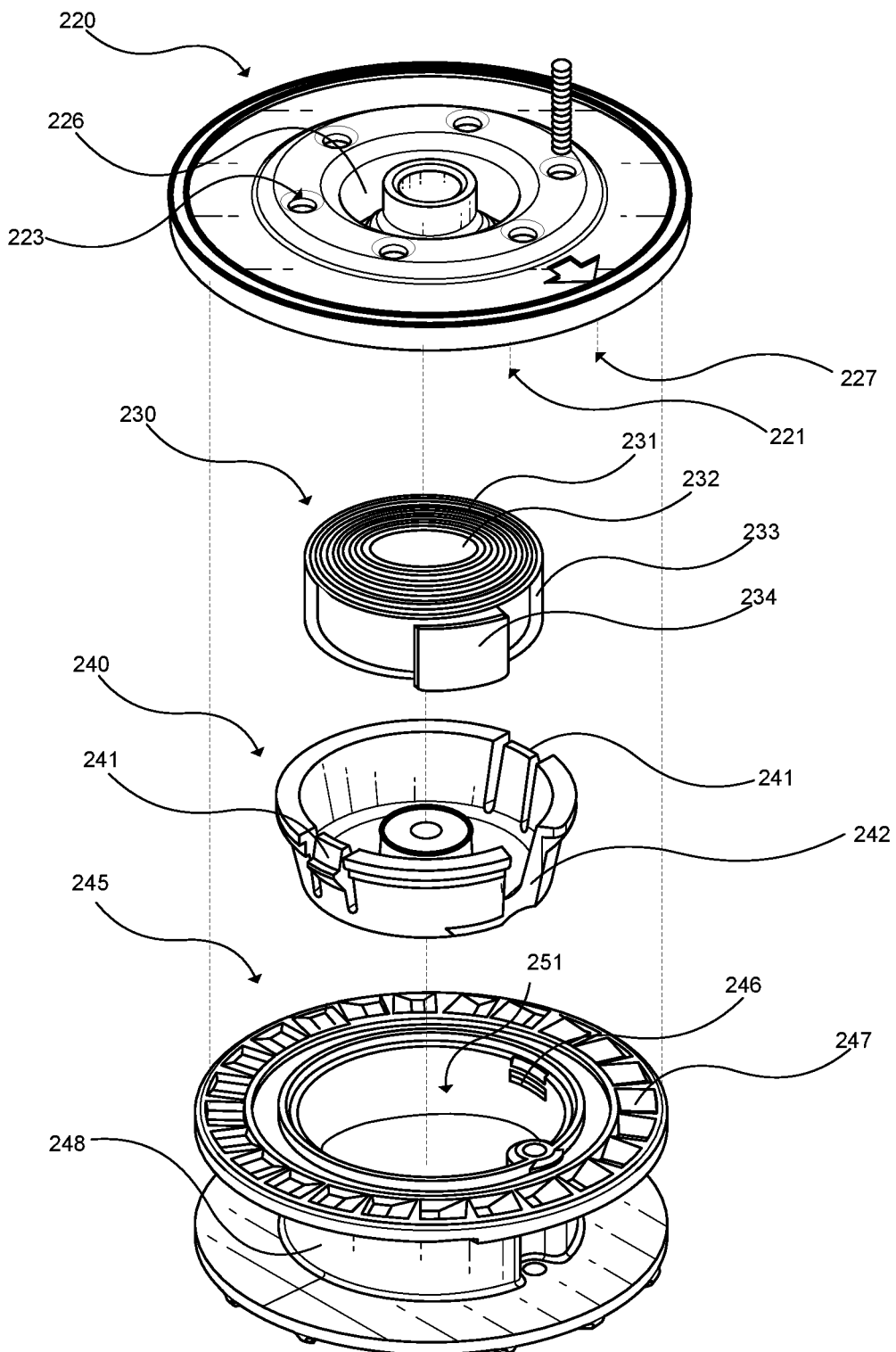
FIG. 3C illustrates a portion of the exploded view depicted in 3A, in accordance with one or more embodiments of the present disclosure.

FIG. 3C illustrates an exploded view of an example engagement plate 220, an example clock spring 230, an example clock spring retainer 240, and an example leash spool 245. Clock spring 230 may include a spring ribbon wound around and arbor 232 to create a bundle of coils 231 situated within a going barrel 233. Clock spring 230 may further include, at one end of the spring ribbon, a hook 234 or other joint feature. A clock spring retainer 240 may be configured such that the clock spring 230 may be at least partially held within a cavity of the clock spring retainer 240. Clock spring retainer 240 may include a formation 242 configured to engage with the hook 234 (or other joint feature) of clock spring 230 in the assembled condition. Clock spring retainer 240 may restrict one or more movements of clock spring 230 in the assembled condition. Clock spring retainer 240 may further be configured with one or more snap-fit joint features configured to engage with complementary snap-fit joint features within barrel aperture 251 of leash spool 245. For example, as shown, clock spring retainer 240 may include two cantilever snap-fit joints 241 configured to engage with complementary snap-fit joint recesses 246 coupled with or otherwise formed within barrel aperture 251 of leash spool 245.

Leash spool 245 may comprise a drum 248, each end of the drum configured with a flange extending radially outward along the circumference of the drum 248. Leash spool 245 may be configured to circumscribe at least a portion of the axle structure 201 (introduced in FIG. 3D), and be rotatably movable about the axle structure 201. As shown, an upper flange (also referred to herein as a first flange) of leash spool 245 may be configured with one or more tooth recesses 247 configured to mate with the one or more tooth protrusions 221 (introduced in FIG. 3A) of the engagement plate 220 when the engagement plate is in a second engagement position. In some embodiments, if engagement plate 220 is translated along pins 222 into a position that is close enough to the leash spool 245 that the tooth protrusions 221 of the engagement plate 220 project into the tooth recesses 247 of the leash spool 245, the tooth recesses 247 and the tooth protrusions 221 may be said to be in a mated state or condition, or in an engaged state or condition. Similarly, in such a condition the engagement plate 220 and leash spool 245 may likewise be said to be in a mated state or condition, or in an engaged state or condition.

Conversely, if engagement plate 220 is translated along pins 222 into a position that is not close enough to the leash spool 245 that the tooth protrusions 221 of the engagement plate 220 project into the tooth recesses 247 of the leash spool 245 (i.e., the engagement plate 220 is too far away from the leash spool along the central axis), the tooth recesses 247 and the tooth protrusions 221 may be said to be in an unmated state or condition, or a disengaged state or condition. Similarly, in such a condition the engagement plate 220 and leash spool 245 may likewise be said to be in an unmated state or condition, or in a disengaged state or condition.

Figure 3D:
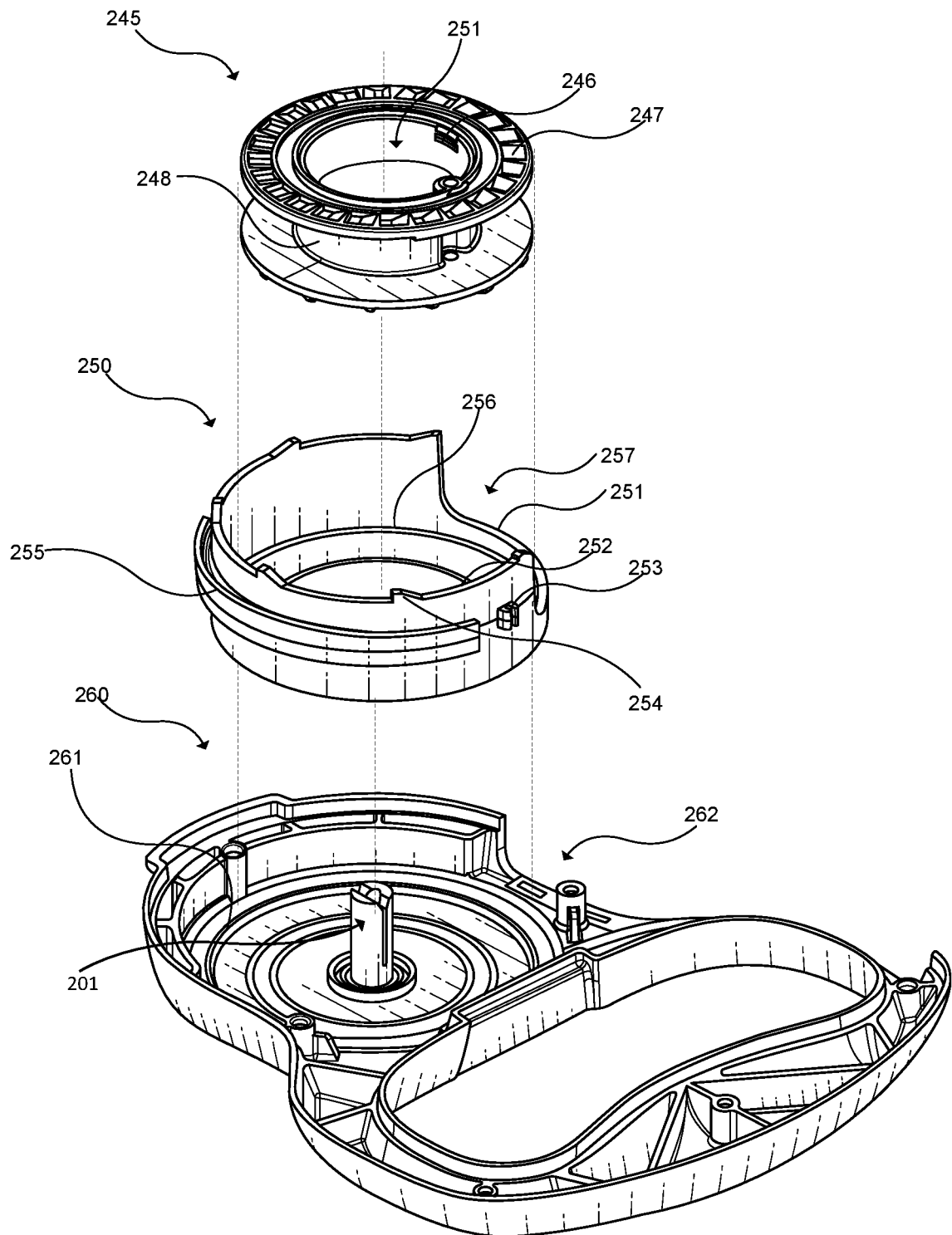
FIG. 3D illustrates a portion of the exploded view depicted in 3A, in accordance with one or more embodiments of the present disclosure.

FIG. 3D illustrates an exploded view of an example leash spool 245, and example release ring 250 and a second support 260 (including an example axle structure 201). As shown, release ring 250 may be described as having a substantially cylindrical or barrel shaped, configured with a substantially flat bottom rim and a staged upper rim (also referred to herein as a stepped upper rim). The upper rim of release ring 250 may be said to be staged because, in some embodiments, it displays a lower elevation 251 (also referred to herein as a first elevation) along a portion of its perimeter, and an upper elevation 252 (also referred to herein as a second elevation) along another portion of its perimeter.

As further shown, the upper elevation 252 of release ring 250 is further configured with one or more ramp features 254. The ramp features 254 are configured to mate with, or otherwise align with, one or more recesses 227 of engagement plate 220 (introduced in FIG. 3A) when the release ring 250 is in a first release ring position. When the release ring 250 is moved into a second release ring position, however the ramp features 254 become completely or partially misaligned with the one or more recesses 227 of engagement plate 220, pushing engagement plate 220 away and toward first support 210 (and against the bias of clutch spring 220). In some embodiments, a height dimension of one or more of the rim features 254 is greater than a height dimension of one or more of the teeth protrusions 221 of engagement plate 220.

Alignment and misalignment of the ramp features 254 of the release ring 250 with the ramp recesses of engagement plate 220 may be controlled by an actuation assembly 285 (shown in FIG. 3E) coupled to the release ring 250, for example, via a wireform receptacle 253. Before discussing an example actuation assembly 285 in further detail, it should be noted that the dimensions of leash spool 245 and release ring 250 may be configured such that a flange of the leash spool 245 may sit atop a shelf 256 structure nested within the release ring 250. Spool 245 may rotate while it sits atop shelf 256, and is positioned within at least a portion of the release ring 250. As the leash spool 245 rotates during operation of the retractable leash assembly 200, a connected leash 300 may pass through the cutout region 257 defined by the staged upper rim of the release ring.

Figure 3E:
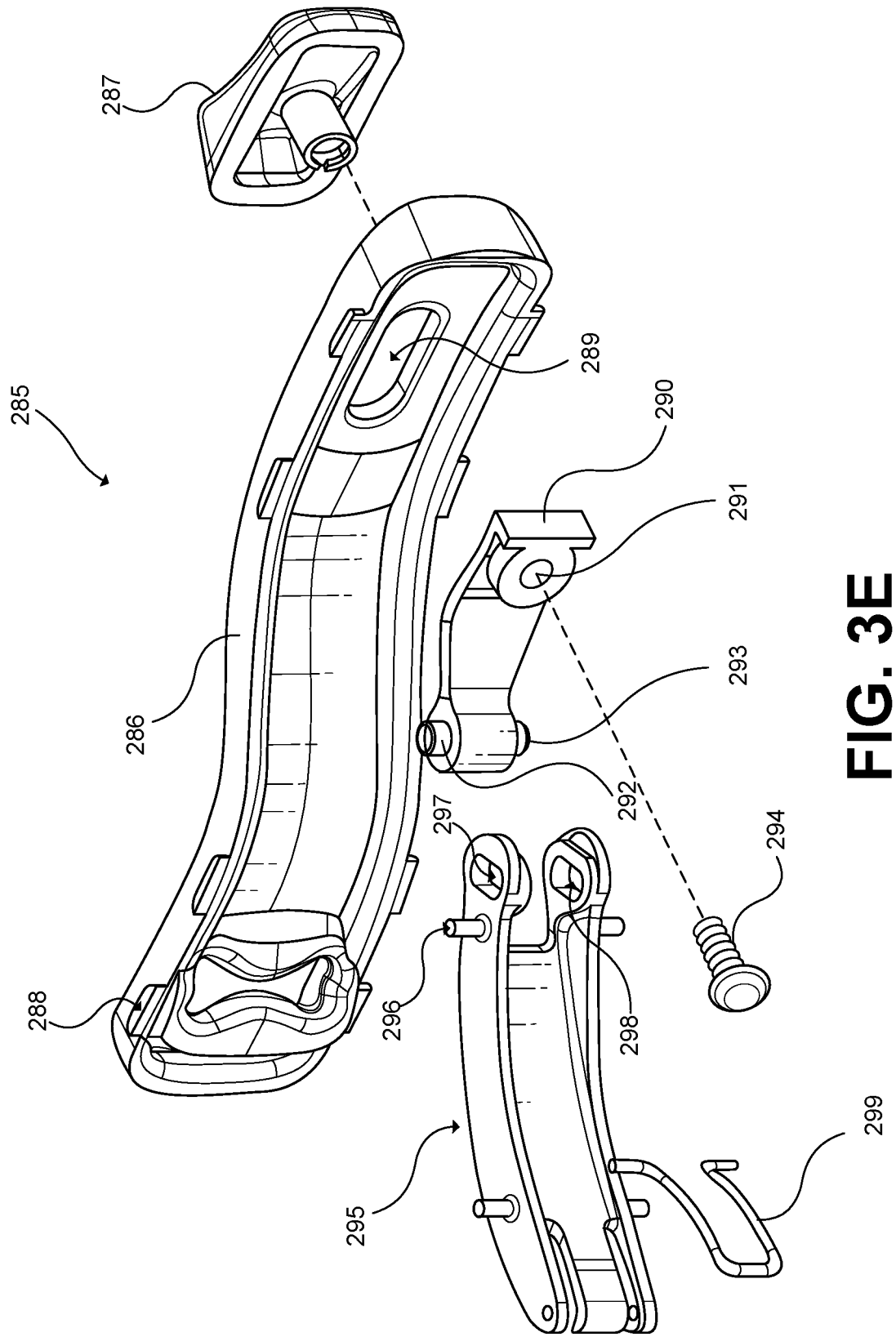
FIG. 3E illustrates a portion of the exploded view depicted in 3A, in accordance with one or more embodiments of the present disclosure.

FIG. 3E illustrates an exploded view of an example actuation assembly in accordance with one or more embodiments of the present disclosure. Actuation assembly 285 may include one or more of a slider 287 (or other type of actuation mechanism such as a button or trigger), a mouth bulge 286 (which in some instances may also be considered part of the housing of the retractable leash assembly 200), a slider linkage member 290, and actuator tang 295, and an actuator wireform 299 configured for attachment to release ring 255.

Mouth bulge 286 may be configured along its perimeter with a plurality of nubs 288 that mate with complementary depressions within the remainder of the housing of an example retractable leash assembly 200. Mouth bulge 286 may further be configured with an aperture 289 through which a portion of slider 287 may pass to engage or otherwise be coupled with button linkage member 290. For example, in some embodiments, slider linkage member 290 and slider 287 may be coupled together, through the mouth bulge aperture 289, via thread forming screw 294. Slider linkage member 290 may be configured with a through hole 291 to enable such coupling. Slider linkage member 290 may further be configured with one or more pivot joints 292, 293 configured to engage with complementary features of actuator tang 295.

Actuator tang 295 is configured with two or more riders 296 (also referred to in some instances herein as pins) that may be positioned within a track formation within one or more of a first support and a second support (in the foregoing examples, the track formation would be formed within the interior of the housing portions of retractable leash assembly 200). In some embodiments, the track formation confines the riders 296 to a path of travel that is substantially in the shape of an arc. As shown, actuator tang 295 is configured with pivot joint receptacle apertures 297, 298 within which pivot joints 292, 293 may be disposed. Actuator tang 295 is further configured to be coupled with actuator wireform 299. As noted earlier, actuator wireform 299 may be coupled with release ring 250. In some particular embodiments, the distal end of the actuator wireform 299 shown in FIG. 3E may be held within wireform receptacle 253 shown in FIG. 3D. In this example structural relationship, movements of the actuator assembly 285 may translate into rotational movements of release ring 250. In some embodiments, for example, movements of slider 287 may cause release ring 250 to rotate between 1° and 20° about the center axis (defined by axle structure 201). In some embodiments, movements of slider 287 may cause release ring 252 rotate more than 20° about the center axis. It should be appreciated however, that in some embodiments it will be desirable that the cut out 257 (created by the staged elevation of the upper rim of release ring 250) of release ring 250 be great enough that, even under the greatest degree of rotation that can be caused by the actuator assembly 285, the release ring 250 will not obstruct the ability of a leash to be wound around leash spool 245.

Referring generally to FIGS. 1A-3E, it is provided herein that an example actuation assembly of the present disclosure may include comprising an actuator (e.g., a slider, trigger, button, etc.) coupled with an actuator tang, with the slider movable between a first slider position and a second slider position, and with the actuator tang coupled to a release ring such that the actuator tang may cause the release ring to rotate in a first direction responsive to the slider being moved from the first slider position into the second slider position. In some such embodiments, rotation of the release ring in the first direction responsive to the slider being moved from the first slider position into the second slider position causes ramps or other features of the release ring to push the engagement plate upward toward the first support (e.g., a top side of the housing) such that the tooth protrusions of the engagement plate disengage with the tooth recesses of the spool and enable the spool to rotate about an axle structure unobstructed by the engagement plate.

In some embodiments, an actuation assembly of the present disclosure may include a button or slider further coupled with an actuator tang, the actuator tang further coupled with a wireform, and the wireform further coupled to the release ring. A mouth bulge member many be disposed between the button and the button linkage member, the mouth bulge member having an aperture through which the button may be coupled with the button linkage member. The aperture within the mouth bulge member may further provide a track creating a path along which the button may be moved, movement upon which may further cause button linkage member to move, in turn causing the actuator tang to move along a path. The actuator tang's movement along such path may cause the wireform to push or pull on a portion of the release ring and cause the release ring to rotate in a first direction or a second direction.

In some embodiments, the actuator tang includes a plurality of pins, the plurality of pins being configured to be held within a track formed in at least a portion of the first support and the second support. In embodiments where a first housing member provides the first support, and a second housing member provides the second support, the track within which the actuator tang's plurality of pins may be held comprises a cutout within the structure of the first housing member and a substantially matching/mirroring cutout within the structure of the second housing member. In some embodiments the cutout within the structure of the first housing member and cutout within the structure of the second housing member define a movement path for the actuator tang in response to movement of the button. In some embodiments, the movement path is in the shape of an arc that substantially matches the radial profile of the release ring.

In some embodiments of the present disclosure, a release ring at least partially rotatable between a first release ring position and a second release ring position about an axis of rotation, the release ring comprising one or more ramps. In some embodiments, responsive to a predetermined movement of an actuator, the release ring is rotated from the first release ring position into the second release ring position, causing the one or more ramps to become misaligned with one or more of the ramp recesses and to push the engagement plate toward the first support and into the first engagement position such that the tooth protrusions of the engagement plate disengage with the tooth recesses of the spool.

In some embodiments, the predetermined movement involves the slider being moved from a first slider position into a second slider position. When such a predetermined movement occurs, the release ring may be caused to rotate from a second release ring position into a first release ring position causing one or more ramps of the release ring to align with the one or more ramp recesses of the engagement plate. Alignment of the one or more ramps with the one or more ramp recesses may permit the engagement plate to be forced into the second engagement position by a force applied from a clutch spring such that tooth protrusions of the engagement plate engage with tooth recesses of the spool. In some embodiments, movement of a slider from a second slider position into a first slider position causes the release ring to rotate from the second release ring position into the first release ring position causing one or more ramps of the release ring to align with and move at least partially into the one or more ramp recesses of the engagement plate.

In some embodiments, rotation of the release ring from the second release ring position into the first release ring position allows a clutch spring to push the engagement plate into the first engagement position such that the tooth protrusions of the engagement plate engage with the tooth recesses of the spool and obstruct the spool from rotation in at least one direction. In some embodiments, a portion of the first side support and a portion of the second side support are configured to be coupled in a fixed spatial relationship relative to each other.

In accordance with some embodiments of the present disclosure, when the actuatable component is caused to move into the second position, a clock spring within the housing and coupled with the spool is caused to become unrestricted by the lock mechanism. In some embodiments, when the clock spring is unrestricted by the lock mechanism (and the leash wound around the spool has been at least partially drawn out), the clock spring causes the spool to spin in a direction that causes a portion of the leash drawn out of the housing to become really wound about the spool, thus retracting back into the housing. In some embodiments, and unrestricted clock spring within the housing is configured to rewind the leash around his spool until one or more of a first condition, a second condition, and a third condition occurs. In some embodiments, the first condition occurs when the length of the leash is wound to the point that the clasp on the second end of the leash reaches the orifice of the housing. In some embodiments, the second condition occurs when resistance caused from a pulling force on the leash overcomes the force being applied to the spool by the clock spring. In some embodiments, the third condition occurs when the clock spring unwinds to a point that it cannot fit any more of the leash material around the barrel of the spool without further restraining the rotatable movement of the spool on account of friction of the leash with another structure within the housing.

In some embodiments of the present disclosure, a second end of a leash is coupled with the spool, and a first end of the leash may be attached to a harness on an animal. In some embodiments, and animal's pulling force on a first end of the leash may cause the spool to rotate in the first direction.

Figure 4:
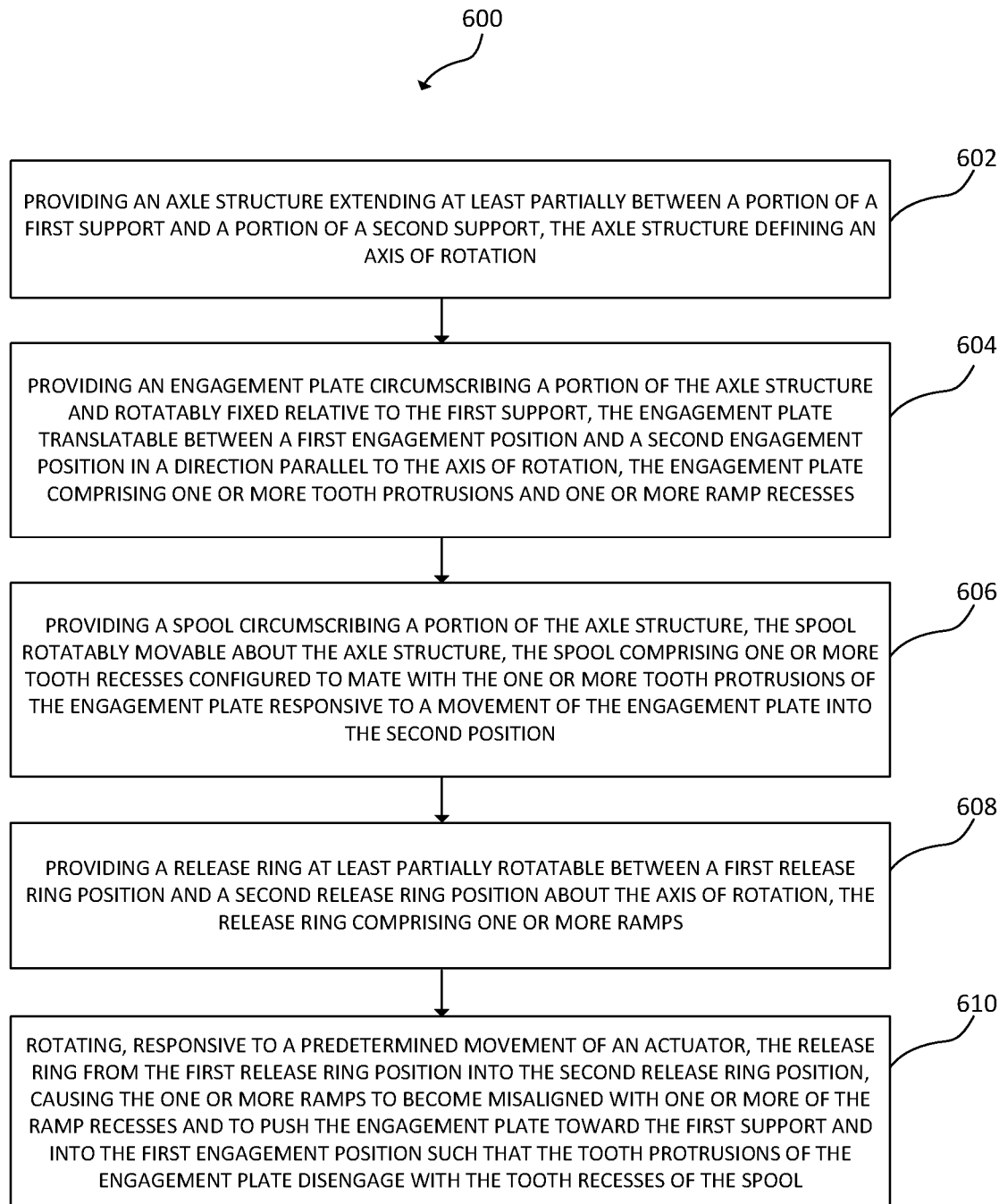
FIG. 4 illustrates an example method in accordance with one or more embodiments of the present disclosure.

The present disclosure also extends to all methods for performing operations, manufacturing elements consistent with, and methods of providing such elements to operate in concert with one another as contemplated herein. For example, FIG. 4 illustrates an example method 600 in accordance with one or more embodiments of the present disclosure.

At operation 602, method 600 involves providing an axle structure extending at least partially between a portion of a first support and a portion of a second support, the axle structure defining an axis of rotation. At operation 604, method 600 involves providing an engagement plate circumscribing a portion of the axle structure and rotatably fixed relative to the first support, the engagement plate translatable between a first engagement position and a second engagement position in a direction parallel to the axis of rotation, the engagement plate comprising one or more tooth protrusions and one or more ramp recesses. At operation 606, method 600 involves providing a spool circumscribing a portion of the axle structure, the spool rotatably movable about the axle structure, the spool comprising one or more tooth recesses configured to mate with the one or more tooth protrusions of the engagement plate responsive to a movement of the engagement plate into the second position. At operation 608, method 600 involves providing a release ring at least partially rotatable between a first release ring position and a second release ring position about the axis of rotation, the release ring comprising one or more ramps. At operation 610, method 600 involves rotating, responsive to a predetermined movement of an actuator, the release ring from the first release ring position into the second release ring position, causing the one or more ramps to become misaligned with one or more of the ramp recesses and to push the engagement plate toward the first support and into the first engagement position such that the tooth protrusions of the engagement plate disengage with the tooth recesses of the spool.

Figure 5:
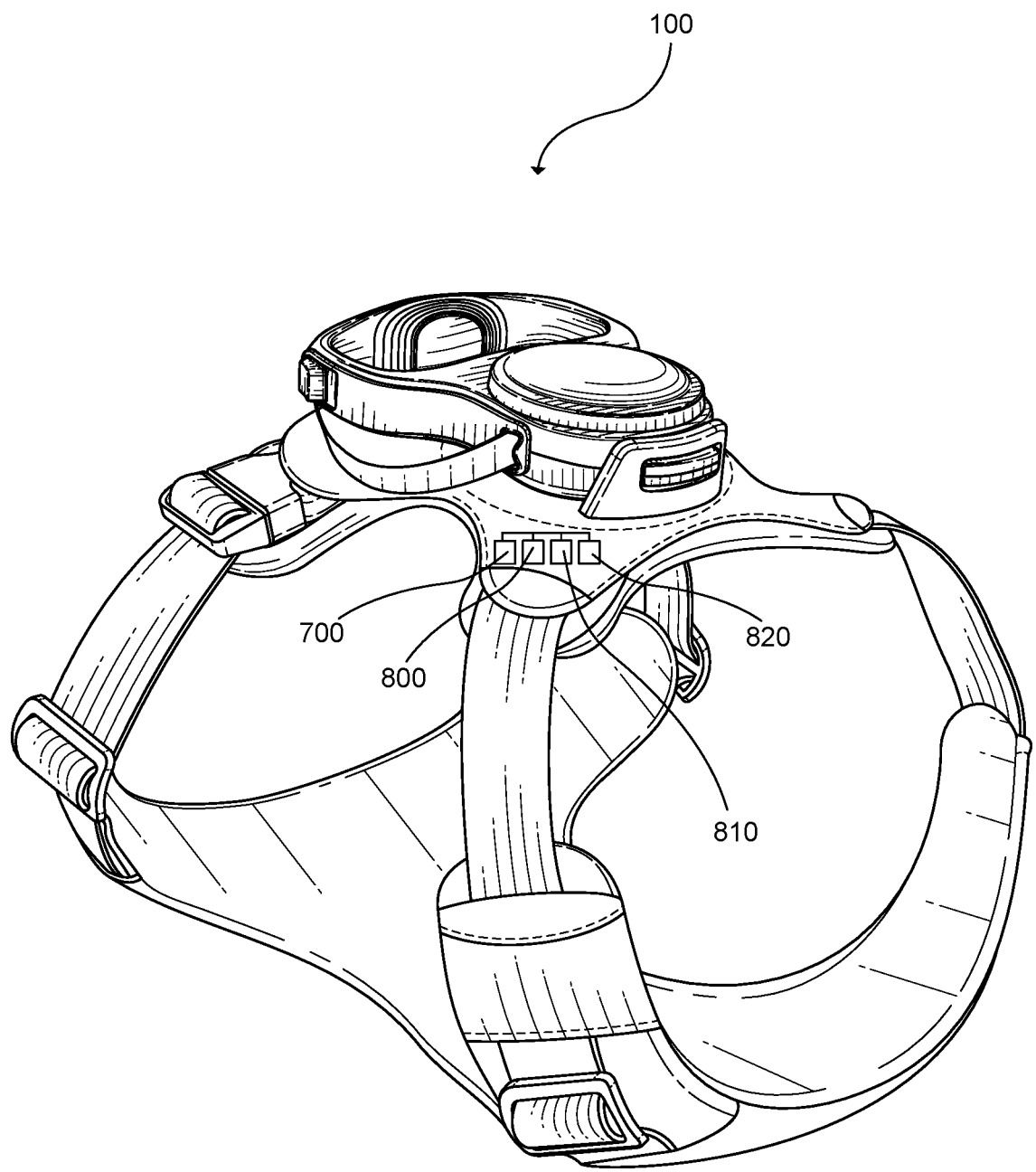
FIG. 5 illustrates an example system equipped with one or more computing features in accordance with one or more embodiments of the present disclosure.

FIG. 5 illustrates an example system consistent with the system introduced in FIGS. 1A-1H, here depicted as being equipped with one or more of a computing module 700, a power source 800, sensors 810, and other electronic devices 820, each of which may be in communication with one or more of the others. Computer module 700 may be configured with a computer program medium and a computer usable medium configured with machine readable instructions to execute one or more of the functions disclosed herein. Sensors 810 may deployed with system 100 to detect one or more conditions of the animal, or the environment the animal is within. Various sensors 810 and electronic devices 820 may be used, alone or in combination with a communications interface of the computing components, to enable a human user to obtain, for example, location information about the animal to which the harness is attached. For example, retractable leash assembly 200 may be equipped with a computing module 700 coupled with one or more of a GPS circuit, a Bluetooth circuit, a cellular communications circuit, a speaker, and a light emitting device. The computing module 700 may be configured to obtain GPS location information via the GPS circuit, and transmit a representation of such data to a user's computing device (e.g., smartphone). This way, if a user attaches retractable leash assembly 200 to the harness 500 via a receptacle 400 to allow their animal to run free in a park, for example, but then later loses the animal upon the animal escaping from the park, the user may relocate the animal by observing the GPS location information transmitted to his/her smartphone via the computing module coupled with the retractable leash assembly 200.

Figure 6:
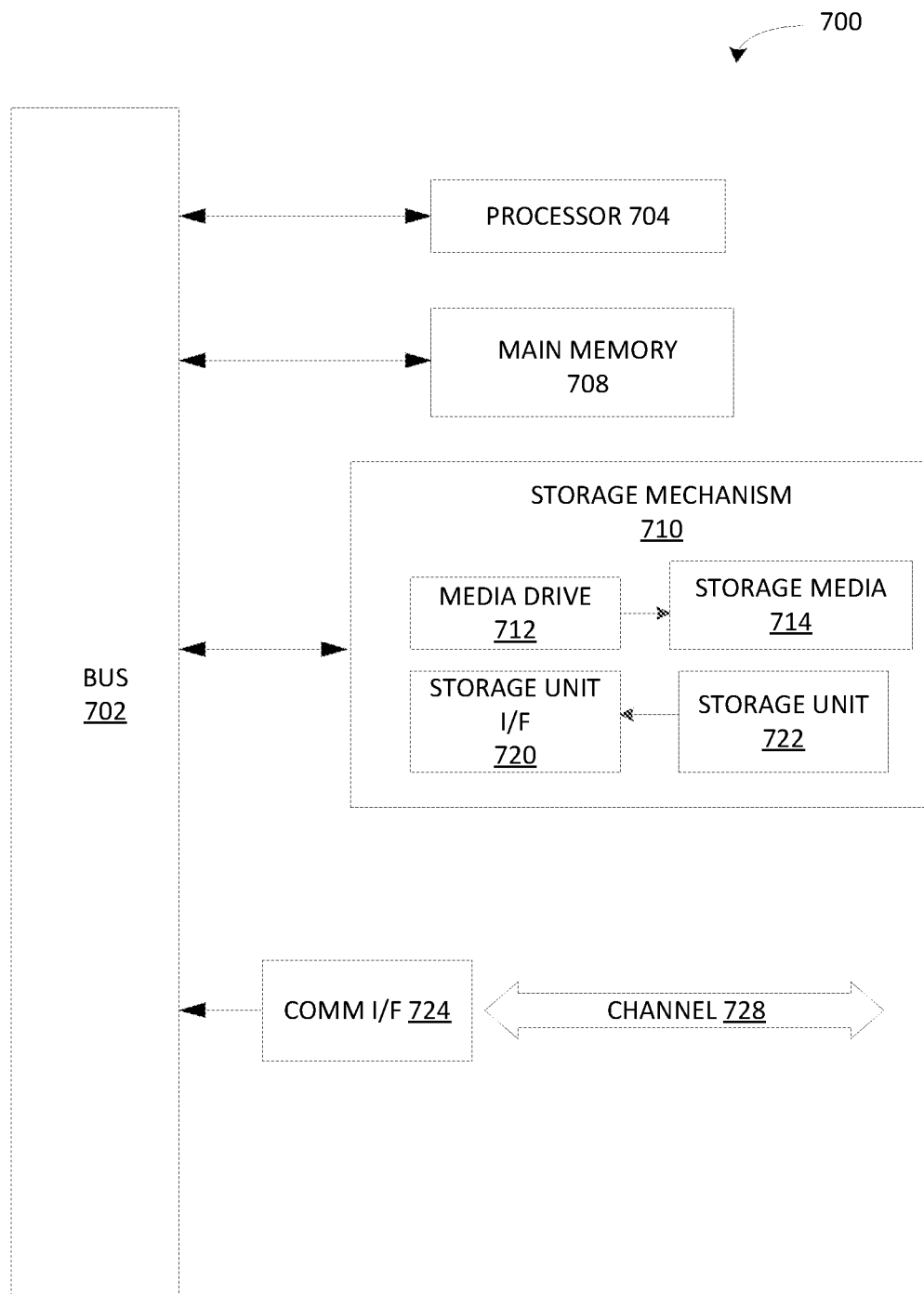
FIG. 6 illustrates an example computing module that may be used in implementing various features of embodiments of the disclosed technology.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 700. After reading this description, it will become apparent to a person skilled in the relevant art how to implement the technology using other computing modules or architectures.

Referring now to FIG. 6, computing module 700 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
   an axle structure extending at least partially between a portion of a first support and a portion of a second support, the axle structure defining an axis of rotation;
   an engagement plate rotatably fixed relative to the first support, the engagement plate translatable between a first engagement position and a second engagement position in a direction parallel to the axis of rotation, the engagement plate comprising one or more tooth protrusions and one or more ramp recesses;
   a spool circumscribing a portion of the axle structure, the spool rotatably movable about the axle structure, the spool comprising one or more tooth recesses configured to mate with the one or more tooth protrusions of the engagement plate responsive to a movement of the engagement plate into the second engagement position; and
   a release ring at least partially rotatable between a first release ring position and a second release ring position about the axis of rotation, the release ring comprising one or more ramps;

wherein, responsive to a predetermined movement of an actuator, the release ring is caused to rotate from the first release ring position into the second release ring position, the rotation causing the one or more ramps to become misaligned with one or more of the ramp recesses and to push the engagement plate into the first engagement position such that the tooth protrusions of the engagement plate disengage with the tooth recesses of the spool.

2. The system of claim 1, further comprising:
a clutch spring compressed between a portion of the first support and a portion of the engagement plate, the clutch spring biasing translation of the engagement plate toward the second engagement position.

3. The system of claim 1, further comprising:
a clock spring coupled to the spool;
wherein rotation of the spool in a first direction causes rotation of a going barrel of the clock spring in a first direction, the rotation of the going barrel in the first direction causing a coil of the clock spring to tighten.

4. The system of claim 3, wherein when the tooth protrusions of the engagement plate are caused to disengage with the tooth recesses of the spool, the clock spring causes the spool to rotate in a second direction.

5. The system of claim 4, further comprising:
a leash coupled with the spool, wherein a pulling force on a first end of the leash causes the spool to rotate in the first direction.

6. The system of claim 1, wherein the actuator comprises a slider; and wherein the predetermined movement comprises the slider being moved from a first slider position into a second slider position.

7. The system of claim 2, wherein a second predetermined movement causes the release ring to rotate from the second release ring position into the first release ring position such that the one or more ramps are caused to align with the one or more ramp recesses of the engagement plate.

8. The system of claim 7, wherein alignment of the one or more ramps with the one or more ramp recesses permits the engagement plate to be pushed into the second engagement position by the clutch spring such that the tooth protrusions of the engagement plate engage with the tooth recesses of the spool.

9. The system of claim 6, wherein movement of the slider from a second slider position into a first slider position causes the release ring to rotate from the second release ring position into the first release ring position such that the one or more ramps move at least partially into the one or more ramp recesses of the engagement plate.

10. The system of claim 2, wherein rotation of the release ring from the second release ring position into the first release ring position allows the clutch spring to push the engagement plate into the first engagement position such that the tooth protrusions of the engagement plate engage with the tooth recesses of the spool and obstruct the spool from rotation in at least one direction.

11. The system of claim 1, wherein a portion of the first side support and a portion of the second side support are configured to be coupled in a fixed spatial relationship relative to each other.

12. A system, comprising:
an axle structure extending at least partially between a portion of a first support and a portion of a second support, the axle structure defining an axis of rotation;
an engagement plate circumscribing a portion of the axle structure and rotatably fixed relative to the first support, the engagement plate translatable between a first engagement position and a second engagement position in a direction parallel to the axis of rotation, the engagement plate comprising one or more tooth protrusions and one or more ramp recesses;
a spool circumscribing a portion of the axle structure, the spool rotatably movable about the axle structure, the spool comprising one or more tooth recesses configured to mate with the one or more tooth protrusions of the engagement plate responsive to a movement of the engagement plate into the second position; and
a release ring at least partially rotatable between a first release ring position and a second release ring position about the axis of rotation, the release ring comprising one or more ramps;
an actuation assembly comprising a slider and an actuator tang, the slider movable between a first slider position and a second slider position, the actuator tang coupled to the release ring such that the actuator tang causes the release ring to rotate in a first direction responsive to the slider being moved from the first slider position into the second slider position, and causes the release ring to rotate in a second direction responsive to the slider being moved from the second slider position into the first slider position;
wherein rotation of the release ring in the first direction responsive to the slider being moved from the first slider position into the second slider position causes the ramps of the release ring to push the engagement plate upward toward the first support such that the tooth protrusions of the engagement plate disengage with the tooth recesses of the spool and enable the spool to rotate about the axle structure unobstructed by the engagement plate.

13. The system of claim 12, further comprising:
a clutch spring compressed between a portion of the first support and the engagement plate, the clutch spring biasing translation of the engagement plate toward the second position.

14. The system of claim 13, wherein rotation of the release ring in the second direction responsive to the slider being moved from the second slider position into the first slider position causes the ramps of the release ring to move at least partially into alignment with the ramp recesses of the engagement plate, allowing the clutch spring to push the engagement plate toward the second support such that the tooth protrusions of the engagement plate engage with the tooth recesses of the spool and obstruct the spool from freely rotating about the axle structure.

15. The system of claim 12, further comprising:
a clock spring coupled to the spool;
wherein rotation of the spool in a first direction causes rotation of a going barrel of the clock spring in the first direction, the rotation of the going barrel in the first direction causing a coil of the clock spring to tighten.

16. The system of claim 15, wherein when the tooth protrusions of the engagement plate are caused to disengage with the tooth recesses of the spool, the clock spring causes the spool to rotate in a second direction.

17. The system of claim 16, wherein the first direction of spool rotation is clockwise and the second direction of spool rotation is counterclockwise.

18. The system of claim 16, wherein the first direction of spool rotation is counterclockwise and the second direction of spool rotation is clockwise.

19. The system of claim 16, further comprising:
a leash coupled with the spool, wherein a pulling force on a first end of the leash causes the spool to rotate in the first direction.

20. The system of claim 12, wherein a portion of the first side support and a portion of the second side support are configured to be coupled in a fixed spatial relationship relative to each other.

21. A method comprising:
providing an axle structure extending at least partially between a portion of a first support and a portion of a second support, the axle structure defining an axis of rotation;
providing an engagement plate circumscribing a portion of the axle structure and rotatably fixed relative to the first support, the engagement plate translatable between a first engagement position and a second engagement position in a direction parallel to the axis of rotation, the engagement plate comprising one or more tooth protrusions and one or more ramp recesses;
providing a spool circumscribing a portion of the axle structure, the spool rotatably movable about the axle structure, the spool comprising one or more tooth recesses configured to mate with the one or more tooth protrusions of the engagement plate responsive to a movement of the engagement plate into the second position;
providing a release ring at least partially rotatable between a first release ring position and a second release ring position about the axis of rotation, the release ring comprising one or more ramps; and
rotating, responsive to a predetermined movement of an actuator, the release ring from the first release ring position into the second release ring position, causing the one or more ramps to become misaligned with one or more of the ramp recesses and to push the engagement plate toward the first support and into the first engagement position such that the tooth protrusions of the engagement plate disengage with the tooth recesses of the spool.

* * * * *